United States Patent
Kim et al.

(10) Patent No.: US 10,020,835 B2
(45) Date of Patent: Jul. 10, 2018

(54) WEARABLE DEVICE AND METHOD OF TRANSMITTING MESSAGE FROM THE SAME

(71) Applicant: Samsung Electronics Co., Ltd., Suwon-si, Gyeonggi-do (KR)

(72) Inventors: Ji-hyun Kim, Seongnam-si (KR); Han-joo Chae, Seoul (KR); Hyun-soo Nah, Seoul (KR); Jong-hyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/953,165

(22) Filed: Nov. 27, 2015

(65) Prior Publication Data

US 2016/0164559 A1    Jun. 9, 2016

(30) Foreign Application Priority Data

Dec. 4, 2014    (KR) .................. 10-2014-0173238

(51) Int. Cl.
*H04W 4/38*    (2018.01)
*H04B 1/3827*    (2015.01)
(Continued)

(52) U.S. Cl.
CPC ............ *H04B 1/385* (2013.01); *H04W 4/025* (2013.01); *H04W 4/12* (2013.01)

(58) Field of Classification Search
CPC ................. H04B 1/385; H04B 1/3827; H04B 2001/3861; H04B 2001/3866;
(Continued)

(56) References Cited

U.S. PATENT DOCUMENTS 8,004,391 B2    8/2011    Cruz Hernandez
8,473,545 B2 *  6/2013    McLaughlin ......... H04L 67/306
                                                        709/203
(Continued)

FOREIGN PATENT DOCUMENTS

KR    10-2010-0136747 A    12/2010
KR    10-2013-0143691 A    12/2013
(Continued)

OTHER PUBLICATIONS

E John Feig: "Android Wear UX", Aug. 4, 2014 (Aug. 4, 2014), XP055403069, Retrieved from the Internet <URL:https://ejf.io/wearables/android_wear/android-wear-ux/> [retrieved on Sep. 1, 2017].

(Continued)

*Primary Examiner* — Meless Zewdu
(74) *Attorney, Agent, or Firm* — Jefferson IP Law, LLP

(57) ABSTRACT

A wearable device worn on a body of a user is provided. The wearable device includes a sensing unit configured to sense state information of the user, a touch input unit configured to receive a touch input from the user, a controller configured to select at least one of a plurality of strings based on the state information when the touch input is received, a display configured to display the selected at least one string, and a communicator configured to transmit a message including the at least one string to a receiver device.

18 Claims, 18 Drawing Sheets

(51) Int. Cl.
*H04W 4/02* (2018.01)
*H04W 4/12* (2009.01)

(58) Field of Classification Search
CPC ............ H04B 2001/385; H04B 1/3833; H04B 2001/3855; G06F 1/163; H04M 1/7253; H04W 4/12; H04W 4/025; H04W 4/02; H04W 4/008; H04W 4/029; H04W 68/00; H04W 68/02; H04W 88/02; H04W 88/04; H04W 8/22; H04W 52/0251; H04W 52/0254; H04W 92/18; H04W 4/70; H04W 76/50; H04W 4/14; H04W 52/288
See application file for complete search history.

(56) References Cited

U.S. PATENT DOCUMENTS

| | | | |
|---|---|---|---|
| 8,671,784 B2* | 3/2014 | Nishibayashi | A61B 5/1118 |
| | | | 73/865.4 |
| 9,037,125 B1* | 5/2015 | Kadous | H04M 1/72577 |
| | | | 455/418 |
| 9,317,155 B2* | 4/2016 | Magi | G06F 3/0414 |
| 9,332,122 B2* | 5/2016 | Zeigler | H04M 3/5116 |
| 9,509,829 B2* | 11/2016 | Culbert | H04M 1/7253 |
| 2001/0025189 A1* | 9/2001 | Haueter | G01N 33/48785 |
| | | | 607/62 |
| 2010/0023472 A1 | 1/2010 | Loeb | |
| 2010/0261448 A1* | 10/2010 | Peters | H04W 4/22 |
| | | | 455/404.1 |
| 2012/0221962 A1 | 8/2012 | Lew et al. | |
| 2012/0315880 A1* | 12/2012 | Peitrow | H04M 1/642 |
| | | | 455/412.1 |
| 2013/0244633 A1* | 9/2013 | Jacobs | H04W 68/00 |
| | | | 455/415 |
| 2013/0344905 A1 | 12/2013 | Kim et al. | |
| 2014/0052681 A1 | 2/2014 | Nitz et al. | |
| 2014/0087685 A1* | 3/2014 | Kellond | G06F 3/041 |
| | | | 455/404.2 |
| 2014/0189528 A1 | 7/2014 | Chang et al. | |
| 2014/0237356 A1 | 8/2014 | Durga et al. | |
| 2015/0172441 A1* | 6/2015 | Samhat | H04M 1/72563 |
| | | | 455/418 |
| 2015/0173674 A1* | 6/2015 | Hayes | A61B 5/681 |
| | | | 600/301 |
| 2015/0178904 A1* | 6/2015 | Boitard | G06T 5/007 |
| | | | 382/274 |
| 2015/0188861 A1* | 7/2015 | Esplin | H04W 4/14 |
| | | | 709/206 |
| 2015/0351695 A1* | 12/2015 | Cronin | A61B 5/747 |
| | | | 600/485 |
| 2016/0026326 A1* | 1/2016 | Wu | G06F 3/04883 |
| | | | 345/173 |
| 2016/0080888 A1* | 3/2016 | Kreitzer | H04B 1/385 |
| | | | 455/39 |
| 2016/0081612 A1* | 3/2016 | Yamamoto | A61B 5/112 |
| | | | 600/595 |
| 2016/0099895 A1* | 4/2016 | Crawford | H04L 12/1895 |
| | | | 709/206 |
| 2016/0198319 A1* | 7/2016 | Huang | H04L 67/26 |
| | | | 455/412.2 |

FOREIGN PATENT DOCUMENTS

| | | |
|---|---|---|
| KR | 10-2014-0088483 A | 7/2014 |
| WO | 2013-115440 A1 | 8/2013 |

OTHER PUBLICATIONS

E John Feig: "Talkray Android Wear Auto Reply", Youtube, Aug. 4, 2014 (Aug. 4, 2014), XP054977703, Retrieved from the Internet <URL:https://www.youtube.com/watch?time_continue=11&v=rfnlTXEvDXM> [retrieved on Sep. 6, 2017].

* cited by examiner

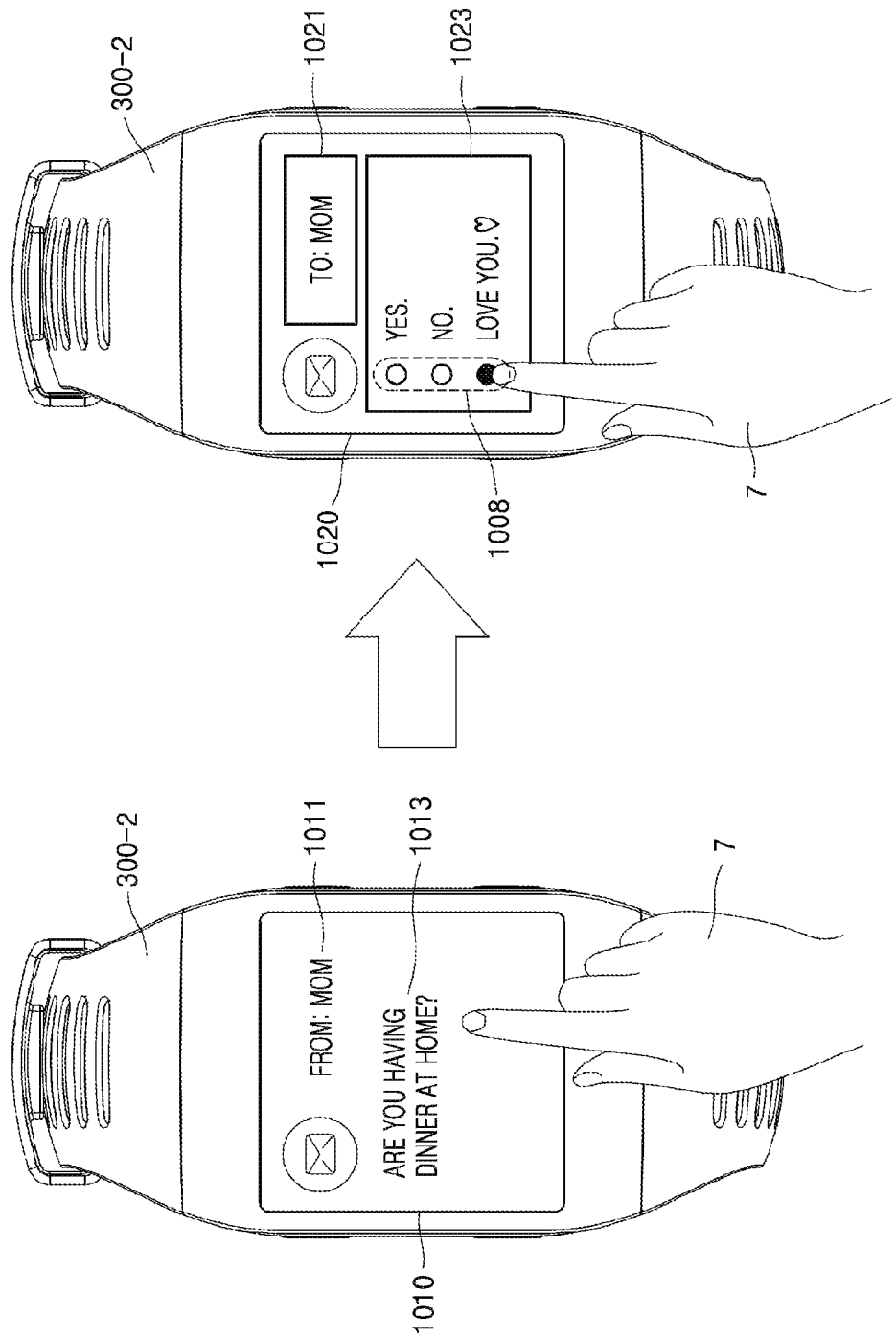

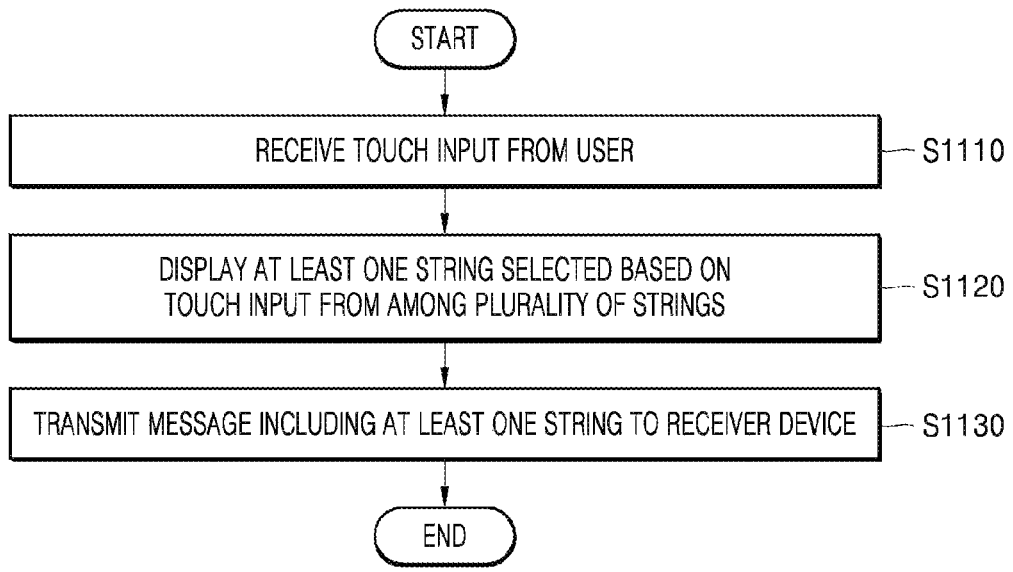

WEARABLE DEVICE AND METHOD OF TRANSMITTING MESSAGE FROM THE SAME

CROSS-REFERENCE TO RELATED APPLICATION(S)

This application claims the benefit under 35 U.S.C. § 119(a) of a Korean patent application filed on Dec. 4, 2014 in the Korean Intellectual Property Office and assigned Serial number 10-2014-0173238, the entire disclosure of which is hereby incorporated by reference.

TECHNICAL FIELD

The present disclosure relates to wearable devices and methods of transmitting a message from the wearable devices. More particularly, the present disclosure relates to methods of allowing a user to easily transmit a message by providing a message that is predictive of a message intended by the user, and wearable devices for implementing the methods.

BACKGROUND

Various portable terminals such as smartphones, smart watches, smart glasses or tablet personal computers (PCs) have a message transmitting and receiving function in addition to a voice call function as a basic communication function. The message transmitting and receiving function refers to a function of transmitting information constructed as text written on a portable terminal to another portable terminal, or receiving information constructed as text written on another portable terminal. The function of transmitting and receiving a text message to and from a portable terminal may be referred to as a message service. Examples of the message service are short message service (SMS), multimedia messaging service (MMS), and e-mail service.

With the recent rapid widespread use of portable terminals, populations using message service are also rapidly increasing. Message service is easy to use and allows quick transmission of content and repeated message transmission attempts even if a voice call is not possible. Accordingly, message service is currently solidifying its place as a communication method next to voice calls.

However, with the trend of making more compact portable terminals, space for a keyboard to write a text message in the portable terminals is being gradually reduced. Thus, instead of using a physical keyboard, a method of receiving character inputs via keys of a virtual keyboard displayed on a touch screen has been developed by providing a virtual keyboard to a user based on a touch screen.

However, since the physical size of the hands and fingers of a user who uses a portable terminal cannot be reduced, the virtual keyboard displayed on the touch screen needs to have keys of a predetermined size or larger. Thus, the virtual keyboard may also be a restrictive element in regard to manufacturing compact portable terminals. In particular, it is difficult to provide a virtual keyboard on a touch screen in order to receive character inputs from a user, in a wearable device which has a relatively narrow space allocated for reception of a touch input from the user.

Thus, a need exists for a method of allowing a user to write a text message quickly and accurately without using a keyboard on a wearable device and a wearable device for implementing the method.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of allowing a user to write a text message quickly and accurately without using a keyboard on a wearable device and wearable devices for implementing the methods.

Additional aspects will be set forth in part in the description which follows and, in part, will be apparent from the description, or may be learned by practice of the presented embodiments.

In accordance with an aspect of the present disclosure, a wearable device worn on a body and/or clothing of a user is provided. The wearable device includes a sensing unit configured to sense state information of the user, a touch input unit configured to receive a touch input from the user, a controller configured to select at least one of a plurality of strings based on the state information when the touch input is received, a display configured to display the selected at least one string, and a communicator configured to transmit a message including the at least one string to a receiver device.

The state information of the user may include at least one of information related to a movement of the user, information related to a location of the user, and information related to a biometric signal of the user.

The state information of the user may include information related to a movement of the user, wherein the controller determines a type of a movement of the user based on the state information of the user, and selects at least one string corresponding to the determined type of movement from among the plurality of strings based on the determined type of movement.

The state information of the user may include at least one of information related to the location of the user and information related to the biometric signal of the user, wherein the controller selects at least one of the plurality of strings based on the state information of the user, and the display displays the state information of the user and the selected at least one string.

The display may display a string set including strings corresponding to the state information of the user from among the plurality of strings, and the touch input unit receives a user input for selecting at least one of the strings included in the string set, and the communicator transmits a message including the selected at least one string to the receiver device based on the user input.

The display may display a string selected based on the touch input from among the plurality of strings and at least one string selected based on the state information of the user from among the plurality of strings, wherein the communicator transmits a message including the string selected based on the touch input and the at least one string to the receiver device.

The controller may obtain information about a schedule of the user, and select at least one of the plurality of strings based on the state information of the user and the information about the schedule.

The controller may obtain information about a receiver device, and select at least one of the plurality of strings based on the state information of the user and the information about the receiver device.

The information about the receiver device may include information about intimacy indicating a degree of relationship between the user and a user of the receiver device, wherein the controller selects at least one of the plurality of strings based on the state information of the user and the intimacy information.

The information about the receiver device may include a record of strings included in past messages that have been transmitted by the wearable device to the receiver device, wherein the controller selects at least one of the plurality of strings based on the state information of the user and the record.

In accordance with another aspect of the present disclosure, a method of transmitting a message at a wearable device is provided. The method includes receiving a touch input from a user, displaying, when the touch input is received, at least one string selected from among a plurality of strings based on state information of the user, and transmitting a message including the at least one string to a receiver device.

The state information of the user may include at least one of information related to a movement of the user, information related to a location of the user, and information related to a biometric signal of the user.

The state information of the user may include information related to a movement of the user, wherein the displaying of the at least one string includes determining a type of a movement of the user based on the state information of the user, selecting at least one string corresponding to the determined type of movement from among the plurality of strings based on the determined type of movement, and displaying the selected at least one string.

The state information of the user may include at least one of information related to the location of the user and information related to the biometric signal of the user, wherein the displaying of the at least one string includes selecting at least one of the plurality of strings based on the state information of the user, and displaying the state information of the user and the selected at least one string.

The displaying of the at least one string may include displaying a string set including strings corresponding to the state information of the user from among the plurality of strings, and the transmitting of the message includes receiving a user input for selecting at least one of the strings included in the string set, and transmitting a message including the selected at least one string to the receiver device based on the user input.

The displaying of the at least one string may include displaying a string selected based on the touch input from among the plurality of strings and at least one string selected based on the state information of the user from among the plurality of strings, wherein the transmitting of the message includes transmitting a message including the string selected based on the touch input and the at least one string to the receiver device.

The displaying of the at least one string may include obtaining information about a schedule of the user, selecting at least one of the plurality of strings based on the state information of the user and the information about the schedule, and displaying the selected at least one string.

The displaying of the at least one string may include obtaining information about a receiver device, selecting at least one of the plurality of strings based on the state information of the user and the information about the receiver device, and displaying the selected at least one string.

In accordance with another aspect of the present disclosure, an electronic device for transmitting a message by using a wearable device is provided. The electronic device includes a communicator configured to receive from the wearable device state information of a user obtained from the wearable device and a touch input of the user obtained from the wearable device, and a controller configured to select at least one of a plurality of strings based on the state information when the touch input is received, wherein the communicator is further configured to transmit the selected at least one string to the wearable device and transmit a message including the at least one string to a receiver device, wherein the transmitted at least one string is displayed via the wearable device.

In accordance with another aspect of the present disclosure, a method of transmitting a message by using a wearable device, wherein the method is performed by an electronic device is provided. The method includes receiving from the wearable device state information of a user obtained from the wearable device and a touch input of the user obtained from the wearable device, selecting at least one of a plurality of strings based on the state information when the touch input is received, transmitting the selected at least one string to the wearable device and displaying the transmitted at least one string via the wearable device, and transmitting a message including the at least string to a receiver device.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram for explaining a method of displaying a string set that is selectable by a user according to an embodiment of the present disclosure;

FIG. 11 is a flowchart of a method of transmitting a message based on a touch input from a wearable device according to an embodiment of the present disclosure;

FIG. 12 illustrates an example of strings corresponding to a touch gesture according to an embodiment of the present disclosure;

Throughout the drawings, it should be noted that like reference numbers are used to depict the same or similar elements, features, and structures.

DETAILED DESCRIPTION

Figure 1:
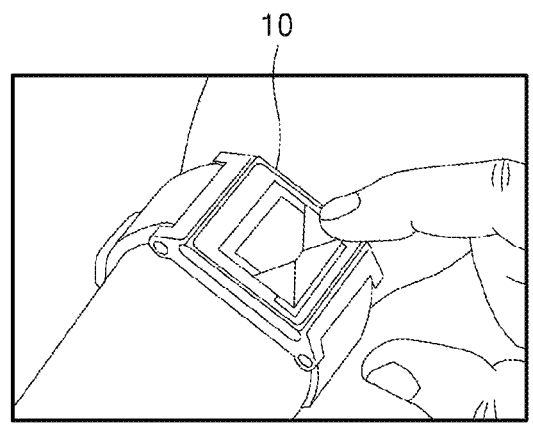
FIG. 1 illustrates inconveniences experienced by a user wearing a wearable device when inputting a string representing a text message according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

The advantages and features of the inventive concept and methods of achieving the advantages and features will be described more fully with reference to the accompanying drawings, in which various embodiments of the inventive concept are shown. The inventive concept may, however, be embodied in many different forms and should not be construed as being limited to the embodiments set forth herein; rather these embodiments are provided so that this disclosure will be thorough and complete, and will fully convey the concept of the inventive concept to one of ordinary skill in the art.

Hereinafter, the terms used in the specification will be briefly described, and then the inventive concept will be described in detail.

The terms used in this specification are those general terms currently widely used in the art in consideration of functions in regard to the inventive concept, but the terms may vary according to the intention of those of ordinary skill in the art, precedents, or new technology in the art. Also, specified terms may be selected by the applicant, and in this case, the detailed meaning thereof will be described in the detailed description of the inventive concept. Thus, the terms used in the specification should be understood not as simple names but based on the meaning of the terms and the overall description of the inventive concept.

Throughout the specification, it will also be understood that when a component "includes" an element, unless there is another opposite description thereto, it should be understood that the component does not exclude another element but may further include another element. In addition, terms such as a " . . . unit" used in the specification refers to a hardware component such as software or hardware component such as field programmable gate array (FPGA) or application specific integrated circuit (ASIC), and a " . . . unit" performs certain functions. However, a " . . . unit" is not limited to software or hardware. A " . . . unit" may be configured in an addressable storage medium or to reproduce one or more processors. Thus, for example, a " . . . unit" includes components such as software components, object-oriented software components, class components, task components, processes, functions, attributes, procedures, subroutines, segments of programs codes, drivers, firmware, microcodes, circuits, data, databases, data structures, tables, arrays, and variables. Functions provided in the components and the " . . . units" may be combined with a smaller number of components and " . . . units" or separated from additional components and " . . . units."

Hereinafter, the inventive concept will now be described more fully with reference to the accompanying drawings, in which various embodiments of the inventive concept are shown such that one of ordinary skill in the art may easily construct and use the inventive concept. Details that are not related to the inventive concept will be omitted for clarity of description.

FIG. 1 illustrates inconveniences experienced by a user wearing a wearable device when inputting a string representing a text message according to an embodiment of the present disclosure.

A wearable device refers to a device that can be worn on the body and/or clothing of a user. For example, as illustrated in FIG. 1, a wearable device 10 is in the form of a watch and may be temporarily fixed to a wrist of a user by using a watch strap or the like.

Space in a wearable device allocated to receive a touch input is limited. For example, the wearable device 10 of FIG. 1 may include a touch panel on a bezel which is a boundary for fixing a display. Thus, it is difficult to provide a touch panel having a sufficient size to provide a virtual keyboard in the wearable device 10. Accordingly, a system and method for allowing a user to quickly and accurately write a text message and transmit the same from a wearable device, without using a keyboard, is necessary.

The present disclosure provides a system and method allowing a user to easily transmit a message by providing a text message that is predictive of text intended by the user.

Figure 2A:
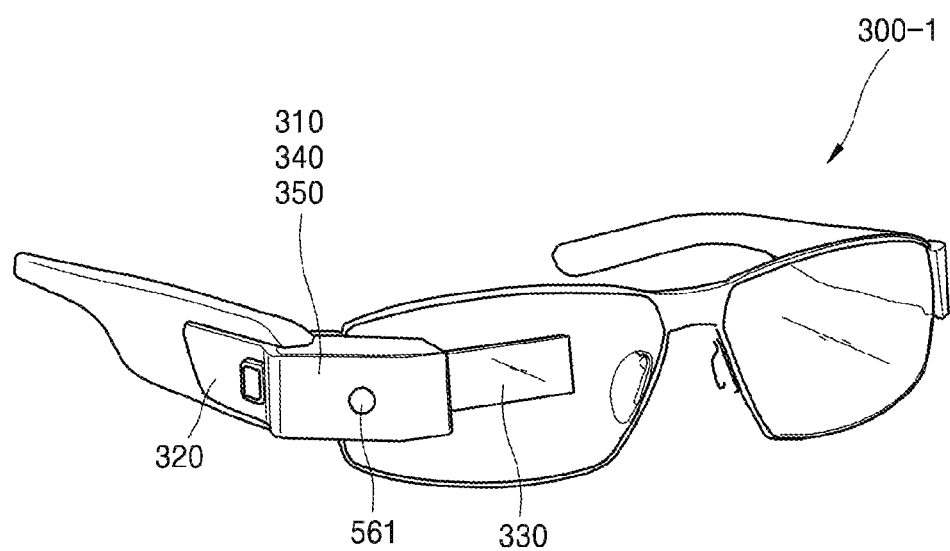
FIGS. 2A, 2B, and 2C illustrate examples of a wearable device according to an embodiment of the present disclosure.
Figure 2B:
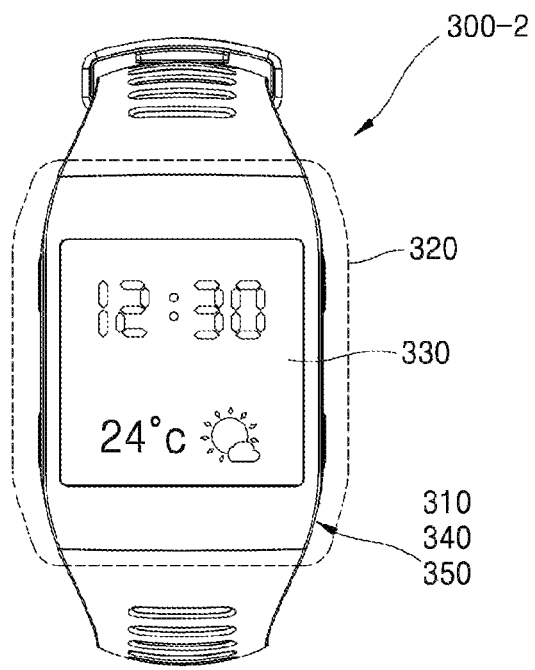
Figure 2C:
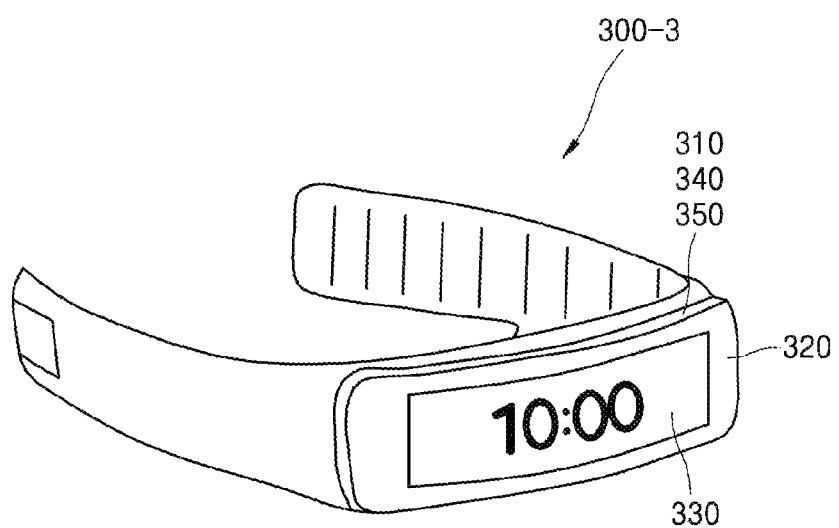

FIGS. 2A, 2B, and 2C illustrate examples of a wearable device according to an embodiment of the present disclosure.

According to an embodiment of the present disclosure, referring to FIG. 2A, a wearable device 300-1 may be in the form of smart glasses that are temporarily fixed to the head of a user on at least one of the ears or on the nose of the user. However, the form of the wearable device 300-1 is not limited to the form illustrated in FIG. 2A, and the wearable device 300-1 may also be attached to a helmet structure or be modified to goggles, masks, visors or similar structures.

The wearable device 300-1 illustrated in FIG. 2A in the form of smart glasses may include a touch input unit 320, a display 330, a camera 561, and a controller 350. However, not all of the elements illustrated in FIG. 2A are essential elements of the wearable device 300-1. The wearable device 300-1 may be implemented using more elements or fewer elements than those illustrated in FIG. 2A.

Some elements included in the wearable device 300-1 may be mounted inside the wearable device 300-1, and other elements may be mounted on an outer portion of the wearable device 300-1. For example, the controller 350 may be mounted inside the wearable device 300-1.

The wearable device 300-1 may further include therein, in addition to the controller 350, a sensing unit 310 for sensing a state of a user wearing the wearable device 300-1, a state of the wearable device 300-1, and/or a state of an external environment. Also, the wearable device 300-1 may further include a communicator 340 for communicating with other electronic devices. The touch input unit 320, the display 330, and the camera 561 may be mounted on the outer portion of the wearable device 300-1. However, elements mounted inside the wearable device 300-1 and elements mounted on the outer portion of the wearable device 300-1 are not limited to those described above.

A frame that maintains the form of the wearable device 300-1 may be formed of a material such as plastic and/or metal, and may include wiring or other conductors for connecting the elements included in the wearable device 300-1 to one another.

The touch input unit 320 may include a touch pad that is operable by a finger of the user. While the touch input unit 320 is illustrated as being disposed on a lateral side portion of the wearable device 300-1, the touch input unit 320 may also be disposed at another position or combination of positions on the wearable device 300-1. The wearable device 300-1 may receive various user inputs via the touch input unit 320.

The display 330 may be disposed at an upper end of a right lens of the wearable device 300-1 as illustrated in FIG. 2A but embodiments are not limited thereto. As illustrated in FIG. 2A, the display 330 may be formed of a semi-transmissive optical waveguide (e.g., a prism). The display 330 illustrated in FIG. 2A may reflect light emitted from an internal projector of the wearable device 300-1 and focus an image on the foveae of retinas of the eyes of the user who wears the wearable device 300-1. However, the display 330 included in the wearable device 300-1 according to the present disclosure is not limited to FIG. 2A, and may display an image close to the eyes of the user by using any number of methods and structures.

The camera 561 may capture an image of the surroundings of the user wearing the wearable device 300-1.

Referring to FIG. 2B, a wearable device 300-2 may be in the form of a smart watch temporarily fixed to a wrist of a user.

The wearable device 300-2 illustrated in FIG. 2B in the form of a smart watch may include a touch input unit 320, a display 330, and a controller 350. However, not all of the elements illustrated in FIG. 2B are essential elements of the wearable device 300-2. The wearable device 300-2 may be implemented using more elements or fewer elements than those illustrated in FIG. 2B.

Some of the elements included in the wearable device 300-2 may be mounted inside the wearable device 300-2, and the other elements may be mounted on an outer portion of the wearable device 300-2. For example, the controller 350 may be mounted inside the wearable device 300-2.

The wearable device 300-2 may further include therein, in addition to the controller 350, a sensing unit 310 for sensing a state of a user wearing the wearable device 300-2, a state of the wearable device 300-2, and/or a state of an external environment. Also, the wearable device 300-2 may further include a communicator 340 for communicating with other electronic devices. The touch input unit 320 and the display 330 may be mounted on the outer portion of the wearable device 300-2. However, elements mounted inside the wearable device 300-2 and elements mounted on the outer portion of the wearable device 300-2 are not limited as described above.

A frame that maintains the form of the wearable device 300-2 may be formed of a material such as plastic and/or metal, and may include wiring or other conductors for connecting the elements included in the wearable device 300-2 to one another.

The touch input unit 320 may include a touch pad that is operable by a finger of the user. While the touch input unit 320 is illustrated as being disposed on a watch plate included in the wearable device 300-2 in FIG. 2B, the touch input unit 320 may also be disposed at another position or combination of positions on the wearable device 300-2. The wearable device 300-2 may receive various user inputs via the touch input unit 320.

The display 330 may be disposed on the watch plate of the wearable device 300-2 as illustrated in FIG. 2B. The display 330 and a touch pad for receiving a touch input may be in a layer structure so as to configure a touch screen. In this case, the display 330 may also perform a function of the touch input unit 320.

Referring to FIG. 2C, a wearable device 300-3 may be in the form of a smart band that is temporarily fixed to, for example, a wrist, a forearm, or an ankle of the user.

The wearable device 300-3 in the form of a smart band illustrated in FIG. 2C may include a touch input unit 320, a display 330, and a controller 350. However, not all of the elements illustrated in FIG. 2C are essential elements of the wearable device 300-3. The wearable device 300-3 may be implemented using more elements or fewer elements than those illustrated in FIG. 2C.

Some of the elements included in the wearable device 300-3 may be mounted inside the wearable device 300-3, and the other elements may be mounted on an outer portion of the wearable device 300-3. For example, the controller 350 may be mounted inside the wearable device 300-3.

The wearable device 300-3 may further include therein, in addition to the controller 350, a sensing unit 310 for sensing a state of a user wearing the wearable device 300-3, a state of the wearable device 300-3, and/or a state of an external environment. Also, the wearable device 300-3 may further include a communicator 340 for communicating with other electronic devices. The touch input unit 320 and the display 330 may be mounted on the outer portion of the wearable device 300-3. However, elements mounted inside the wearable device 300-3 and elements mounted on the outer portion of the wearable device 300-3 are not limited to those described above.

A frame that maintains the form of the wearable device 300-3 may be formed of a material such as plastic and/or metal, and may include an elastic band so that the wearable device 300-3 is temporarily fixed to the body of the user regardless of the body size of the user. Also, the frame maintaining the form of the wearable device 300-3 may include wiring or other conductors for connecting the elements included in the wearable device 300-3 to one another.

The touch input unit 320 may include a touch pad that is operable by a finger of the user. While the touch input unit 320 is illustrated as being disposed on a surface on which the display 330 is disposed in FIG. 2C, the touch input unit 320 may also be disposed at another position or combination of positions on the wearable device 300-3. The wearable device 300-3 may receive various user inputs via the touch input unit 320.

The display 330 and a touch pad for receiving a touch input may be in a layer structure so as to configure a touch screen. In this case, the display 330 may also perform a function of the touch input unit 320.

As illustrated in FIGS. 2A, 2B, and 2C, the wearable device 300-1, 300-2, or 300-3 according to an embodiment of the present disclosure may have various forms.

Figure 3:
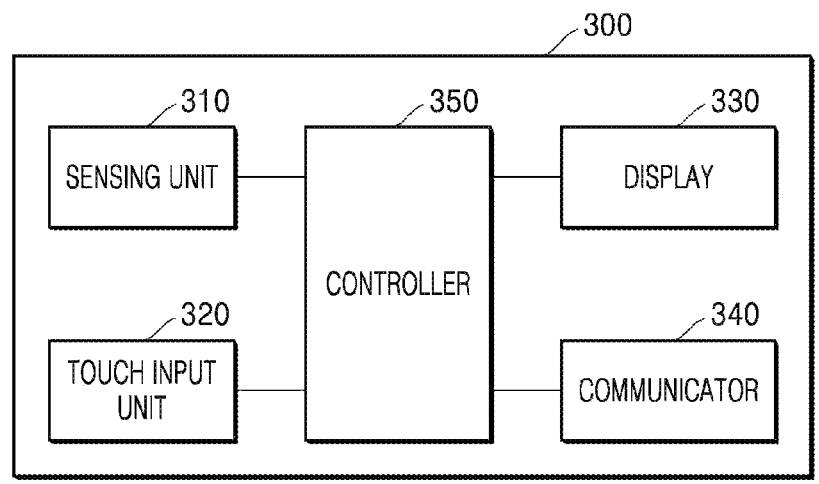
FIG. 3 is a block diagram illustrating a wearable device according to an embodiment of the present disclosure.
Figure 5:
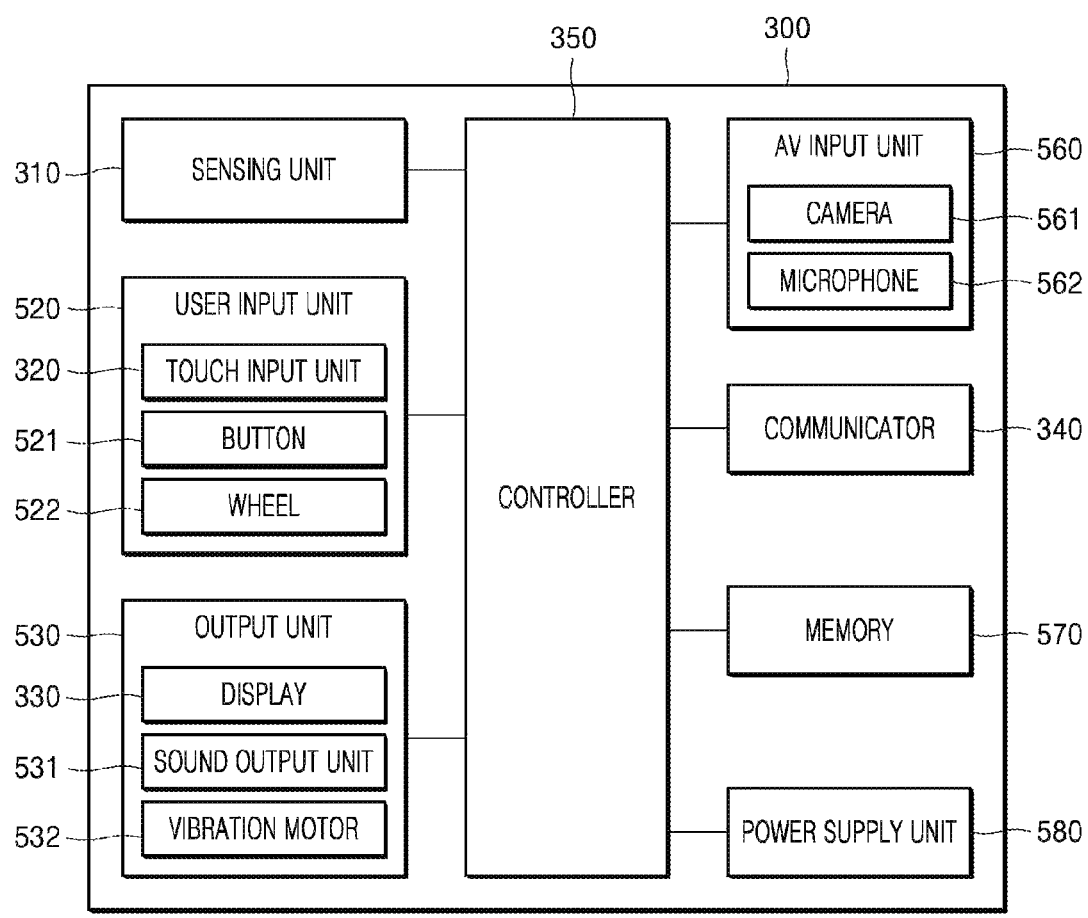
FIG. 5 is a detailed block diagram illustrating a wearable device according to an embodiment of the present disclosure.

FIGS. 3 and 5 are block diagrams illustrating a wearable device such as any of devices 10, 300-1, 300-2, or 300-3, according to an embodiment of the present disclosure. Elements of the wearable device will now be described in detail with reference to FIG. 3.

A wearable device 300 according to an embodiment of the present disclosure is an electronic device that can be worn on the body and/or clothing of a user, and may be an electronic device providing a text message service. Referring to FIG. 3, the wearable device 300 according to an embodiment of the present disclosure may include a sensing unit 310, a touch input unit 320, a display 330, a communicator 340, and a controller 350.

The sensing unit 310 may include at least one sensor and sense various information used to determine a state of the user, a state of the wearable device 300, and a state of a surrounding environment. For example, the sensing unit 310 may sense state information of the user. The state information of the user may include at least one of information related to a movement of the user, information about a location of the user, and information related to a biometric signal of the user. Various sensors that may be included in the sensing unit 310 will be described later with reference to FIG. 4.

The touch input unit 320 may receive a touch input from the user. The touch input unit 320 may detect a touch input from a user touching the touch input unit 320 by using a pointing object. The pointing object according to the present specification refers to an instrument used to actually touch a touch panel or to provide a proximity touch on the touch panel. Examples of the pointing object are a stylus pen or a finger.

The touch input unit 320 included in the wearable device 300 according to an embodiment of the present disclosure may be configured to detect a real touch and a proximity touch by the user on the touch input unit 320. A "real touch" according to the present specification denotes an actual touch of a pointing object contacting a touch panel, and a "proximity touch" denotes an approach of a pointing object within a predetermined distance from a touch panel without contacting the touch panel.

A "touch" according to the present specification may be interpreted as indicating only a real touch, but is not limited thereto. A "touch" according to the present specification may also be interpreted as indicating both a real touch and a proximity touch.

The touch input unit 320 according to an embodiment of the present disclosure may also receive a touch input via various operations of a pointing object. For example, a touch input may refer to an operation of a user touching for a predetermined period of time the touch input unit 320 by using a pointing object. The wearable device 300 may determine that a touch input is received when a touch on the touch input unit 320 is continuously detected for a period of time (e.g., tens to several hundreds of milliseconds). Various touch gestures detected by the touch input unit 320 will be described later in detail with reference to FIG. 12.

The controller 350 controls an overall operation of the wearable device 300. The controller 350 selects at least one of a plurality of previously stored strings representing a text message upon receiving a touch input via the touch input unit 320. The plurality of strings may be mapped with various information and stored.

For example, the controller 350 may select at least one of the plurality of strings based on state information of the user. Alternatively, the controller 350 may select at least one of the plurality of strings based on a type of a touch input by the user. Alternatively, the controller 350 may select at least one of the plurality of strings based on a schedule of the user. Alternatively, the controller 350 may select at least one of the plurality of strings based on information about a receiver device.

The display 330 may display information processed by using the wearable device 300. The display 330 may display at least one string selected by the controller 350. Also, the display 330 may further display a user interface (UI) for receiving a user input to control the wearable device 300 or a UI for setting a parameter related to an operation of receiving a touch input and an operation of transmitting a message to a receiver device or the like.

The display 330 may be in a layer structure with the touch input unit 320 so as to be configured as a touch screen. In this case, the touch screen performs both the functions of the touch input unit 320 and the display 330 so as to be used as an input device in addition to as an output device. The display 330 may include at least one of a liquid crystal display (LCD), a thin film transistor-LCD (TFT-LCD), an organic light-emitting diode (OLED), a flexible display, a three-dimensional (3D) display, and an electrophoretic display. Also, the display 330 may be formed of a semi-transmissive optical waveguide (e.g., a prism).

The communicator 340 may communicate with at least one electronic device or server. The communicator 340 may receive from an electronic device a control signal for controlling the wearable device 300 or a signal indicating information about a state of an electronic device. Also, the communicator 340 may transmit to an electronic device a control signal for controlling the electronic device, a signal indicating information about a state of the wearable device 300 or the like. Also, the communicator 340 may transmit a message including at least one string selected by the controller 350, to at least one electronic device.

The communicator 340 may include a Bluetooth low energy (BLE) module (not shown), a Bluetooth module (not shown), a near field communication (NFC) module (not shown), a radio frequency (RF) module (not shown), and a mobile communication module (not shown) or combinations thereof.

Figure 4:
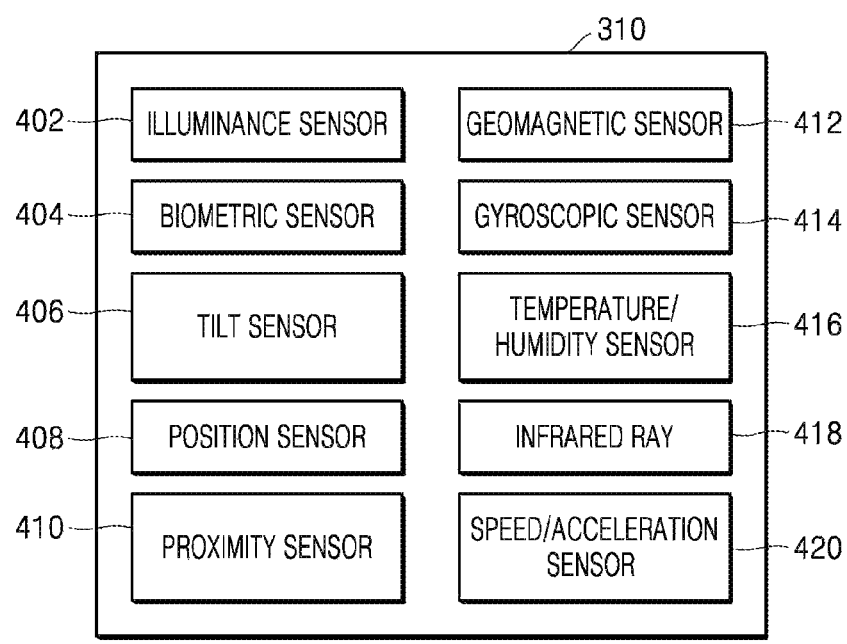
FIG. 4 is a block diagram illustrating a sensing unit included in a wearable device according to an embodiment of the present disclosure.

FIG. 4 is a block diagram illustrating a sensing unit included in a wearable device according to an embodiment of the present disclosure.

Referring to FIG. 4, the sensing unit 310 according to an embodiment of the present disclosure may include at least one of an illuminance sensor 402, a biometric sensor 404, a tilt sensor 406, a position sensor 408, a proximity sensor 410, a geomagnetic sensor 412, a gyroscopic sensor 414, a temperature/humidity sensor 416, an infrared sensor 418, and a speed/acceleration sensor 420 or a combination thereof. Also, various sensors other than those illustrated in FIG. 4 may be included in the sensing unit 310.

The sensing unit 310 may include sensors of various combinations according to an implementation form of the wearable device 300. For example, the wearable device 300 may include at least one of the tilt sensor 406, the position sensor 408, the geomagnetic sensor 412, the gyroscopic sensor 414, and the speed/acceleration sensor 420 or a combination thereof to thereby sense information related to a movement of the user as state information of the user but embodiments are not limited thereto.

The wearable device 300 may include the biometric sensor 404 to thereby sense information related to a biometric signal of the user. The biometric sensor 404 may include at least one of a heart rate sensor, a blood sugar sensor, a blood pressure sensor, a sweat secretion sensor, a body temperature sensor, and an iris recognition sensor (or an iris scanning sensor) but embodiments are not limited thereto.

The wearable device 300 may include the position sensor 408 to thereby sense information related to a position of the user. The position sensor 408 may include a global positioning system (GPS) module, a Wi-Fi protected setup (WPS) module, a BLE module, or the like, but embodiments are not limited thereto. For example, the position sensor 408 may include a GPS module and sense a position of the wearable device 300 by using a GPS. Alternatively, the position sensor 408 may include a WPS module and sense a position of the wearable device 300 by using a Wi-Fi map.

The wearable device 300 may include the temperature/humidity sensor 416 to thereby sense information related to an environment of the user. The temperature/humidity sensor 416 may sense at least one of a temperature and a humidity of a surrounding environment of the wearable device 300. The speed/acceleration sensor 420 may sense at least one of a speed and an acceleration of the wearable device 300 to thereby obtain information related to a movement of the user wearing the wearable device 300.

FIG. 5 is a detailed block diagram illustrating a wearable device according to an embodiment of the present disclosure.

Referring to FIG. 5, the wearable device 300 according to an embodiment of the present disclosure may further include a user input unit 520, an output unit 530, an audio and video (AV) input unit 560, a memory 570, and a power supply unit 580. However, not all of the elements illustrated in FIG. 5 are essential elements of the wearable device 300. The wearable device 300 may be implemented using more elements or fewer elements than the elements illustrated in FIG. 5. The elements included in the wearable device 300 may be connected to one another via a bus or other conductors or communication elements. The elements of FIG. 5 will be described in detail below.

The user input unit 520 receives a user input for controlling the wearable device 300. The user input unit 520 may include a touch input unit 320 for receiving a touch input from a user, and may further include at least one of a button 521 for receiving a push operation of the user and a wheel 522 for receiving a rotational operation of the user but embodiments are not limited thereto. However, the user input unit 520 according to the present disclosure is not limited to FIG. 5, and may further include a keyboard, a dome switch, or the like. In addition to the user input unit 520 to receive a user input, the sensing unit 310 is provided to receive sensor input as noted above in regard to FIG. 4.

The output unit 530 outputs information received from the communicator 340, information processed by the controller 350 or information stored in the memory 570 in the form of at least one of light, sound or vibration. For example, the output unit 530 may include a display 330 and may further include at least one of a sound output unit 531 for outputting a sound and a vibration motor 532 for outputting a vibration but embodiments are not limited thereto. The sound output unit 531 may output sounds related to functions performed in the electronic device 300 (e.g., a call signal reception sound, a message reception sound, or a notification sound).

The AV input unit 560 is used to input an audio signal or a video signal, and may be, for example, a camera 561 or a microphone 562 but embodiments are not limited thereto. The camera 561 may be used to obtain an image frame such as a still image or a moving image by using an image sensor. An image captured using the image sensor may be processed using the controller 350 or an additional image processor (not shown).

An image frame processed using the camera 561 may be stored in the memory 570 or transmitted to the outside via the communicator 340. At least two cameras 561 may be included according to a configuration aspect of the wearable device 300 but embodiments are not limited thereto.

The microphone 562 receives an external sound signal and processes the same to generate electrical sound data. For example, the microphone 562 may receive a sound signal from an external device or a speaker (i.e., a person speaking). The microphone 562 may use various noise removing algorithms to remove noise generated when receiving an external sound signal.

The memory 570 may store programs used by the controller 350 to process data and control each element of the wearable device 300. Also, the memory 570 may store data that is input to or output from the wearable device 300. Also, the memory 570 may store a plurality of strings. The plurality of strings may be stored in the memory 570 by mapping the plurality of strings with various information. Thus, the controller 350 may select at least one of a plurality of strings stored in the memory 570 based on various information (e.g., state information of a user, information about a receiver device, and/or the type of a touch gesture).

The memory 570 may include a storage medium of at least one type among a flash memory type, a hard disk type, a multimedia card micro type, a card-type memory (e.g., secure digital (SD) or extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk but embodiments are not limited thereto.

Programs stored in the memory 570 may be classified as multiple modules according to their functions. For example, the programs stored in the memory 570 may be classified as a UI module for providing a UI or a graphical user interface (GUI) via the display 330, a touch screen module for sensing a touch gesture via the touch input unit 320 and transmitting information about a touch gesture to the controller 350, and a notification module for generating a signal to notify of an occurrence of an event in the wearable device 300.

The power supply unit 580 supplies power needed to operate the wearable device 300, to respective elements. The power supply unit 580 may include a battery used to recharge power, and may include a cable (not shown) or a cable port via which power may be received from the outside.

Figure 6:
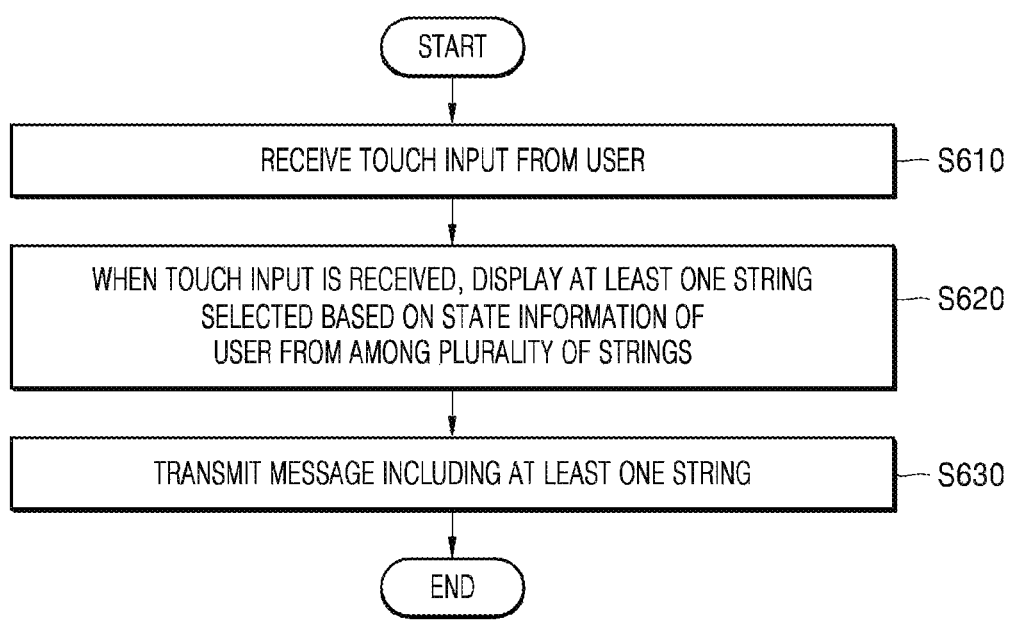
FIG. 6 is a flowchart of a method of transmitting a message based on state information of a user from a wearable device according to an embodiment of the present disclosure.

FIG. 6 is a flowchart of a method of transmitting a message based on state information of a user at a wearable device according to an embodiment of the present disclosure.

Referring to FIG. 6, respective operations of the method may be performed by using the elements of the wearable device 300 illustrated in FIG. 3, 4, or 5, and descriptions provided above with reference to FIG. 3, 4 or 5 will be omitted here.

In operation S610, the wearable device 300 according to an embodiment of the present disclosure may receive a touch input from a user.

Examples of the touch input received from the user may include a touch input for generating a screen to write a new message, a touch input for selecting a receiver device to which a message is to be transmitted, and a touch input for generating a screen to write a response message to a received message.

In operation S620, upon receiving a touch input, the wearable device 300 according to an embodiment of the present disclosure may display at least one string selected based on state information of the user among a plurality of strings.

The wearable device 300 may sense state information of the user upon receiving the touch input. Alternatively, the wearable device 300 may sense state information of the user at predetermined periods and store the same, and when a touch input is received, the wearable device 300 may obtain most recently stored state information of the user.

The wearable device 300 may select at least one of a plurality of strings based on state information of the user. The wearable device 300 may display at least one string selected based on the state information of the user.

The wearable device 300 may obtain at least one of information related to a movement of the user, information about a location of the user, and information about a biometric signal of the user, as the state information of the user.

For example, the wearable device 300 may include at least one of a tilt sensor for sensing a tilt of the wearable device 300 or the user wearing the wearable device 300, a position sensor 408 for sensing a position of the wearable device 300 or the user wearing the wearable device 300, a geomagnetic sensor 412 for sensing a direction of the wearable device 300 or the user wearing the wearable device 300, a gyroscopic sensor 414 for sensing a rotational motion of the wearable device 300 or the user wearing the wearable device 300, and a speed/acceleration sensor 420 for sensing at least one of a speed and an acceleration of the wearable device 300 or the user wearing the wearable device 300 or a combination of these. The wearable device 300 may obtain at least one of a tilt, a position, a direction, a rotation, a speed, and an acceleration of the user wearing the wearable device 300, as information about a movement of the user.

The wearable device 300 may determine whether the user is moving slowly enough to be able to manipulate the wearable device 300 or is moving so rapidly as to not be able to manipulate the wearable device 300, based on the information about a movement of the user. The wearable device 300 may compare at least one of a tilt, a position, a direction, a rotation, a speed, and an acceleration of the user wearing the wearable device 300, with a previously stored at least one threshold value to thereby determine whether the user is moving so rapidly as to not be able to manipulate the wearable device 300.

For example, the wearable device 300 may sense a speed at which a location of the user changes. When a speed at which the location of the user wearing the wearable device 300 changes is equal to or greater than a threshold speed, the wearable device 300 may determine that the user is not able to manipulate the wearable device 300 as the user is moving at a high speed.

The wearable device 300 may select at least one of a plurality of strings based on whether the user is moving so rapidly as to not be able to manipulate the wearable device 300.

For example, when it is determined that the user is moving so rapidly as to not be able to manipulate the wearable device 300, the wearable device 300 may select a string including a text message that an incoming call cannot be answered or a string including a text message that a received message cannot be immediately responded to.

Alternatively, the wearable device 300 may sense a pattern of a movement of the user based on the information about a movement of the user to thereby determine a type of the movement of the user.

For example, when the user is driving, the wearable device 300 may sense a pattern of a movement of the arms of the user operating the steering wheel of a car and determine that the user is driving. Alternatively, when the user is walking, the wearable device 300 may sense a periodic pattern of a movement of the user and a variation in a location of the user and determine that the user is walking. When a speed at which a location of the wearable device 300 changes is equal to or greater than a threshold speed, the wearable device 300 may determine that the user is running.

The wearable device 300 may select at least one string from among a plurality of strings based on the determined type of the movement. The selected at least one string corresponds to the determined type of the movement.

For example, when the wearable device 300 determines that the user is not able to manipulate the wearable device 300 (e.g., when the user is driving or exercising), the wearable device 300 may select a string including a text message that an incoming call cannot be answered or a string including a text message that a received message cannot be immediately responded to.

Alternatively, the wearable device 300 may select a string including a text message that the user is performing a predetermined motion, from among a plurality of strings. For example, when the wearable device 300 has determined that the user is driving, the wearable device 300 may select a string including a text message that the user is driving. Alternatively, when the wearable device 300 has determined that the user is exercising (e.g., when the wearable device 300 determines that the user is running at a threshold speed or greater), the wearable device 300 may select a string including a text message that the user is exercising.

Alternatively, the wearable device 300 may include at least one of a heart rate sensor, a blood sugar sensor, a blood pressure sensor, a sweat secretion sensor, a body temperature sensor, and an iris recognition sensor (or an iris scanning sensor) so as to sense information related to a biometric signal of the user.

The wearable device 300 may determine whether the user is in danger or not, due to a poor health state or based on information about a biometric signal of the user. The wearable device 300 may periodically sense a biometric signal of the user to thereby determine whether the user is in danger due to a poor health state or not.

For example, the wearable device 300 may determine that the user is in danger due to a poor health state when a biometric signal of the user deviates from a threshold range. The wearable device 300 that has determined that the user is in danger due to a poor health state may transmit a message including a text notifying a previously designated receiver device that the user is in danger due to a poor health state.

For example, the previously designated receiver device may include a device carried by a guardian of a user, a hospital or a safety center operated by a public institution but embodiments are not limited thereto. The wearable device 300 may change the previously designated receiver device based on a user input.

The wearable device 300 may further obtain information about a location of the user, and when it is determined that the user is in danger due to a poor health state, the wearable device 300 may transmit, to a receiver device, a message including a string including a text message that the user is in danger due to a poor health state and a text indicating a location of the user.

The wearable device 300 may display at least one string selected from a plurality of strings. The wearable device 300 may display the selected at least one string in a message input window so that the user may edit the selected at least one string.

The wearable device 300 may also display state information of the user with the at least one string selected from among a plurality of strings. For example, when the wearable device 300 has determined that the user is in danger due to a poor health state, the wearable device 300 may select a string including a text message that the user is in danger due to a poor health state. The wearable device 300 may display information related to a biometric signal of the user and/or information about a location of the user with the selected string.

Also, the wearable device 300 may display a string set including strings corresponding to state information of the user from among a plurality of strings. The wearable device 300 may provide a UI allowing the user to select at least one of the strings included in the displayed string set.

Also, the wearable device 300 may provide a UI allowing the user to check whether the string selected and displayed by the wearable device 300 is a string that, for example, the user intends to write or otherwise desires to send. When a user input indicating that the selected string is not a string that the user intends to write is received, the wearable device 300 may automatically select and display another string or may select and display another string based on a user input.

The wearable device 300 may also display a string selected based on a touch input received from the user, together with the at least one string selected based on state information of the user. A detailed description of a method of selecting a string based on a touch input received from the user will be provided later with reference to FIGS. 11 and 12.

Also, the wearable device 300 may obtain information about a schedule of the user, and select at least one of a plurality of strings based on state information of the user and information about the schedule of the user. A detailed description of a method of selecting a string based on information about the schedule of the user will be provided later with reference to FIGS. 13 and 14.

Also, the wearable device 300 may obtain information about a receiver device to which a message to be newly written is to be transmitted, and select at least one of a plurality of strings based on state information of the user and information about the receiver device. A detailed description of a method of selecting a string based on information about the receiver device will be provided later with reference to FIGS. 15, 16, and 17.

Returning to FIG. 6, in operation S630, the wearable device 300 according to an embodiment of the present disclosure may transmit a message including at least one string selected in operation S620 to the receiver device. Transmitting a message to the receiver device by the wearable device 300 indicates that the wearable device 300 transmits the message to contact information corresponding to the receiver device.

The wearable device 300 may transmit a message including the selected at least one string and a string additionally input by the user, to the receiver device.

When the wearable device 300 displays a string set in operation S620, the wearable device 300 may receive a user input for selecting at least one of the strings included in the string set. The wearable device 300 may transmit a message including at least one string selected by the user to the receiver device based on a user input for selecting at least one string.

The wearable device 300 may set a receiver device based on a user input for setting a receiver device of the message in operation S630.

Alternatively, the wearable device 300 may transmit a message to a receiver device that is designated based on a user input in operation S610. For example, the wearable device 300 may determine a sender device, as the receiver device, that has transmitted a received message or made a call when a touch input for generating a screen to write a message to respond to the received message or a touch input for generating a screen to write a message to respond to an incoming call is received.

Alternatively, the wearable device 300 may transmit a message to a previously designated receiver device. For example, when the wearable device 300 determines that the user is in danger due to a poor health state, the wearable device 300 may transmit a message to a previously designated receiver device (e.g., a guardian, a hospital or a safety center operated by a public institution).

Figure 7:
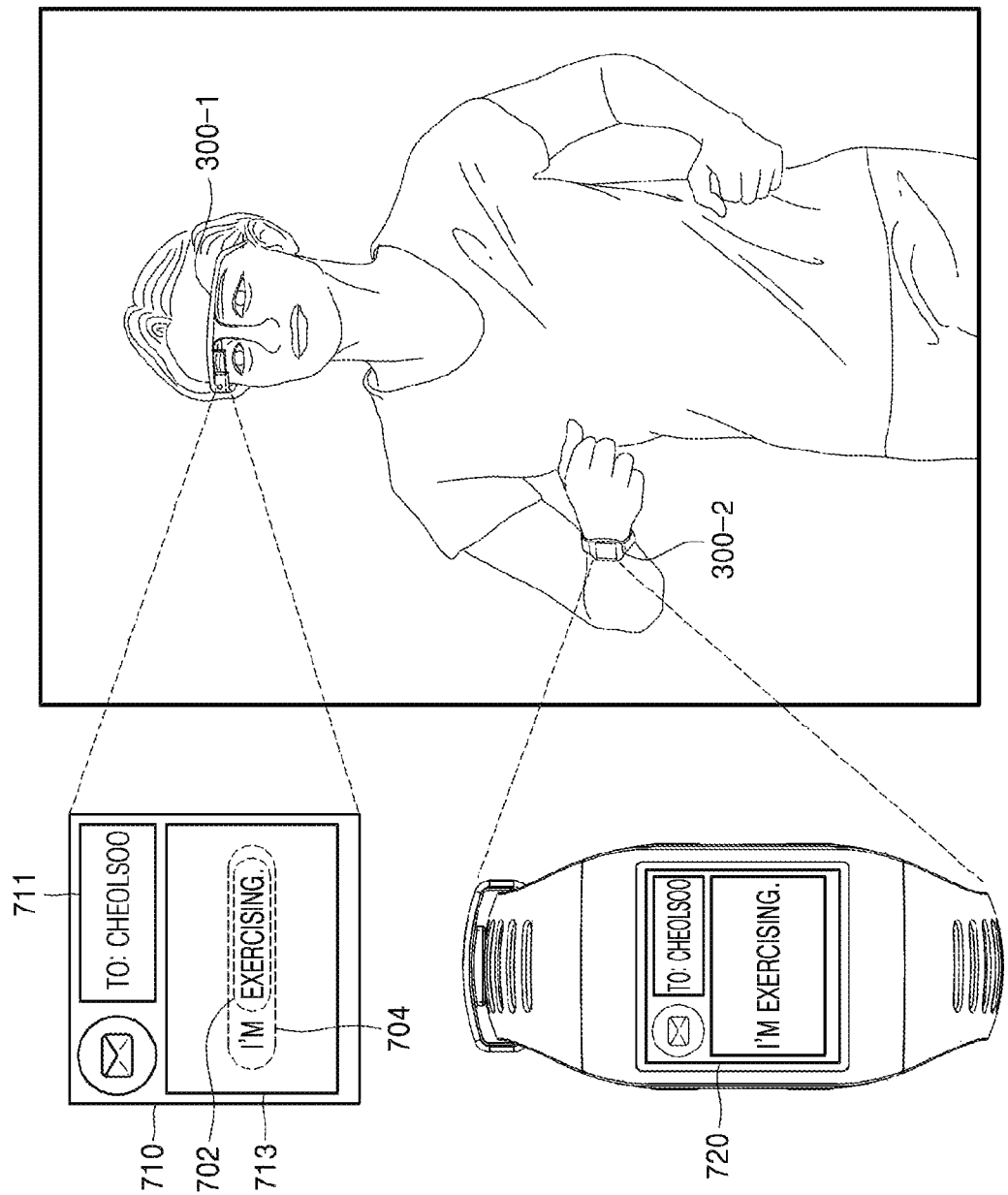
FIGS. 7, 8, and 9 are diagrams for explaining a method of displaying a string selected based on state information of a user from among a plurality of strings according to an embodiment of the present disclosure.
Figure 8:
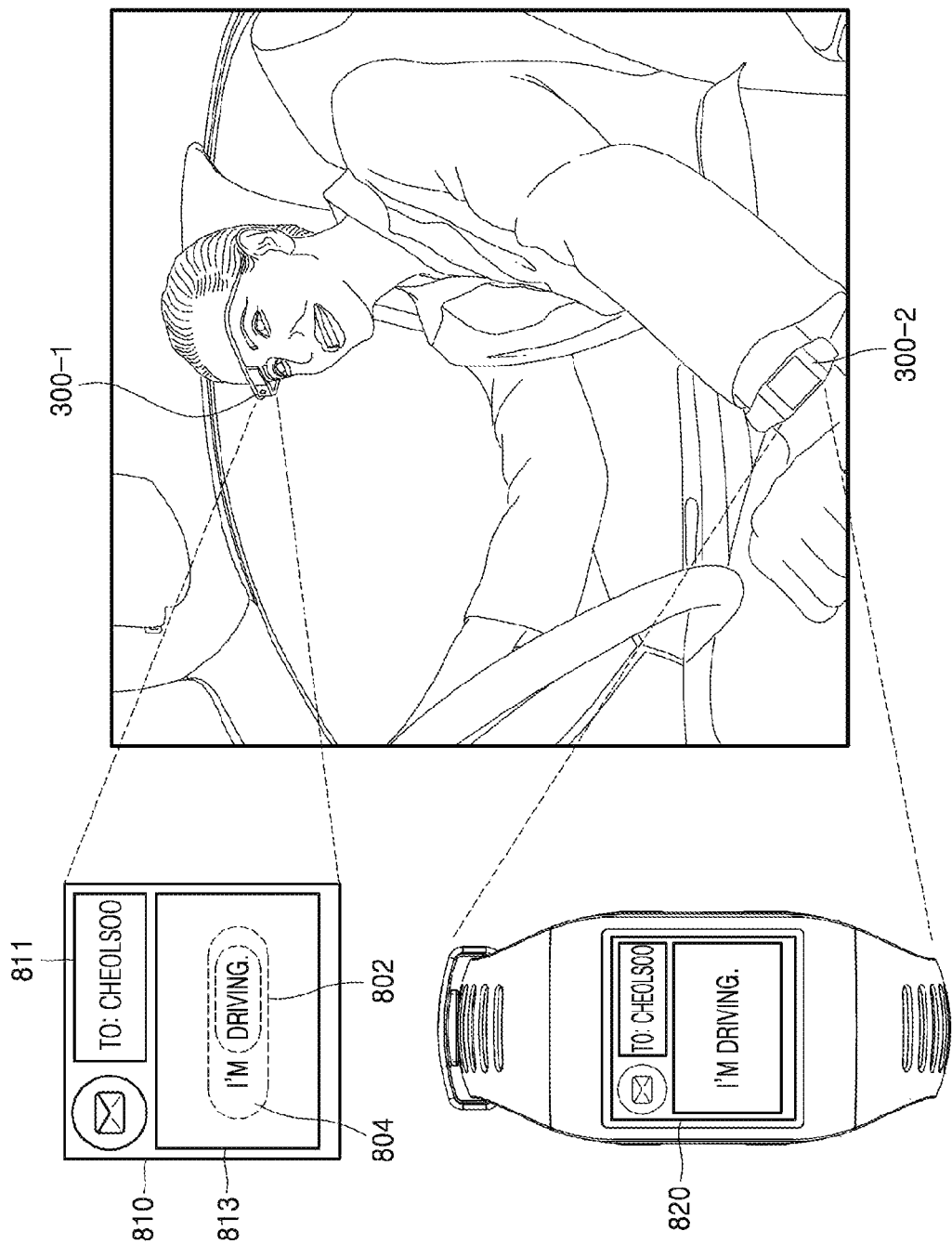
Figure 9:
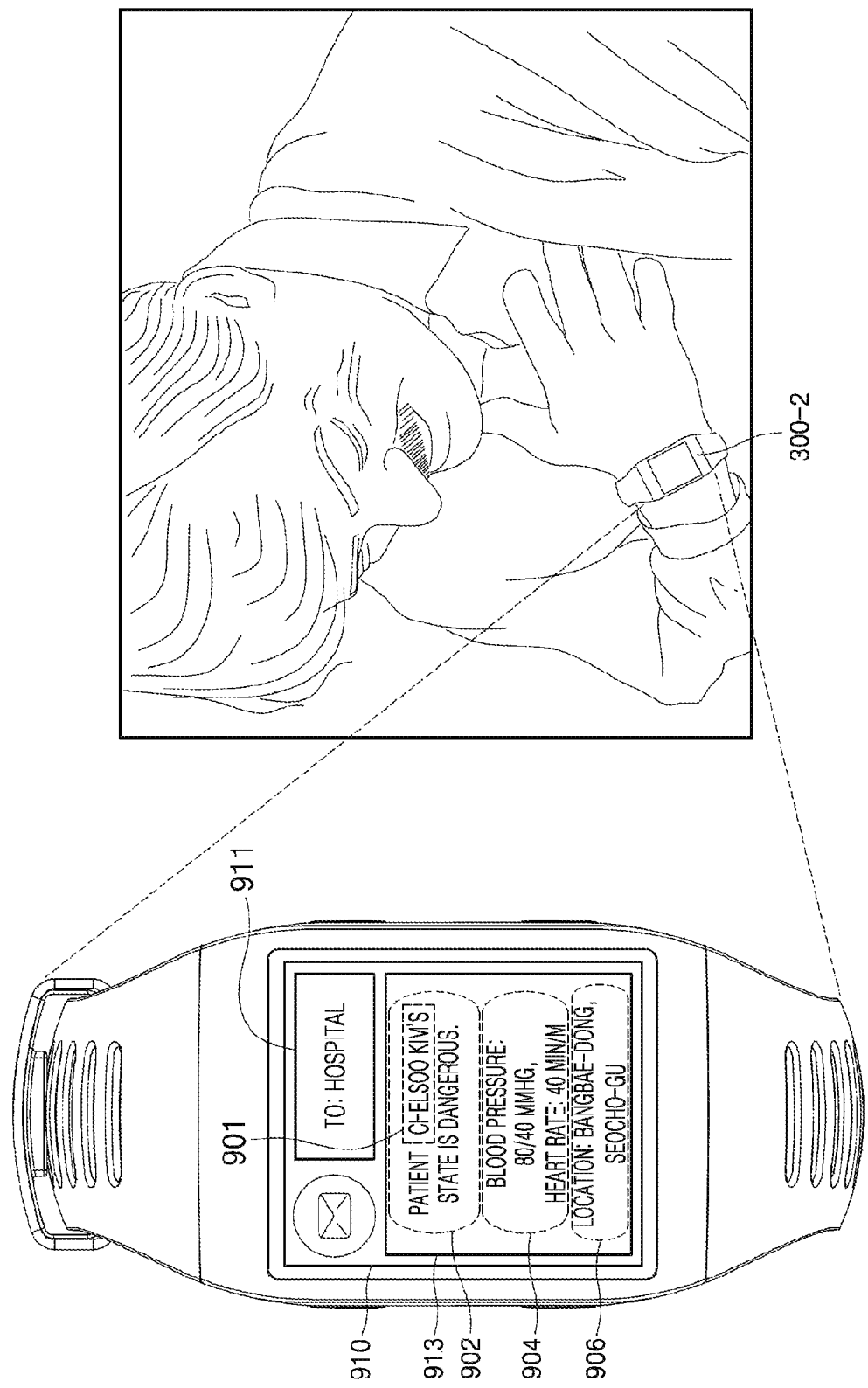

FIGS. 7, 8, and 9 are diagrams for explaining a method of displaying a string selected based on state information of a user, from among a plurality of strings according to an embodiment of the present disclosure.

Referring to FIGS. 7 and 8, the wearable device 300 according to an embodiment of the present disclosure may sense information about a movement of a user and determine a type of the movement of the user. As illustrated in FIGS. 7 and 8, the wearable device 300 according to an embodiment of the present disclosure may be the wearable device 300-1 in the form of smart glasses or the wearable device 300-2 in the form of a smart watch. However, the form of the wearable device 300 according to various embodiments is not limited to the forms illustrated in FIGS. 7 and 8, and may include any number of various forms that can be worn on the body and/or clothing of the user.

FIG. 7 illustrates an example where the user is exercising. When the wearable device 300-1 which is in the form of smart glasses has determined a type of a movement of the user as "exercise," the wearable device 300-1 may display a screen 710 illustrated in FIG. 7. When the wearable device 300-2 which is in the form of a smart watch has determined a type of a movement of the user as "exercise," the wearable device 300-2 may display a screen 720 illustrated in FIG. 7.

Hereinafter, an operation process of the wearable device 300-1 will be described with reference to the screen 710. It will be obvious to one of ordinary skill in the art that description of the wearable device 300-1 below is applicable to the wearable devices 300 according to various embodiments including the wearable device 300-2 illustrated in FIG. 7.

The wearable device 300-1 may select at least one string corresponding to a type of a movement of the user, from among a plurality of strings that are mapped with various types of movements and previously stored based on the type of the movement of the user. The wearable device 300-1 may display the selected at least one string. The wearable device 300-1 may store a plurality of words, a plurality of sentence constructions, or a plurality of sentences as a plurality of strings but embodiments are not limited thereto.

For example, the wearable device 300-1 may store a plurality of strings including words related to a type of a movement of a user. The wearable device 300-1 may select "exercising" 702 which is a string corresponding to the type of the movement of the user from among a plurality of strings based on the type of the movement of the user and display the same. The wearable device 300-1 may complete a sentence 704 that is appropriate for the selected string and display the same.

As another example, the wearable device 300-1 may store a plurality of strings including sentences indicating a type of a movement of a user. The wearable device 300-1 may select "I'm exercising" 704 which is a string corresponding to the type of the movement of the user from among a plurality of strings and display the same. The string selected by the wearable device 300-1, "I'm exercising" 704 may be a string including a text 702 indicating the type of the movement of the user.

The wearable device 300 may display at least one string in the message input window 713 so that the user may edit the selected at least one string based on the type of the movement of the user.

The wearable device 300-1 may transmit a message including the at least one string selected based on the type of the movement of the user, to the receiver device (not shown). The screen 710 includes a receiver display window 711 for displaying the receiver device to receive the message.

The wearable device 300-1 may set a receiver device based on a user input. For example, when a user input for writing a response message to a received message is received, the wearable device 300-1 may set a sender device that has transmitted the received message as a receiver device. Alternatively, when a user input for writing a message responding to an incoming call is received, the wearable device 300-1 may set a sender device that has made the call as a receiver device. Alternatively, the wearable device 300-1 may determine a receiver device based on a user input for selecting contact information included in a previously stored telephone book.

The wearable device 300-1 may transmit a message displayed on the message input window 713 to the receiver device displayed in the receiver display window 711 based on a user input for transmitting a message. The receiver display window 711 may be referred to as a "receiver device display window".

FIG. 8 illustrates an example where a user is driving. When the wearable device 300-1 has determined a type of a movement of the user as "driving," the wearable device 300-1 in the form of smart glasses may display a screen 810 illustrated in FIG. 8. When the wearable device 300-2 has determined a type of a movement of the user as "driving", the wearable device 300-2 in the form of a smart watch may display a screen 820 illustrated in FIG. 8.

For example, the wearable device 300-1 may store a plurality of strings including words related to a type of a movement of the user. The wearable device 300-1 may select "driving" 802 which is a string corresponding to the type of the movement of the user, from among the plurality of strings based on the type of the movement of the user and display the same. The wearable device 300-1 may complete a sentence 804 that is appropriate for the selected string and display the same.

As another example, the wearable device 300-1 may store a plurality of strings including sentences indicating types of movement of a user. The wearable device 300-1 may select "I'm driving." 804 which is a string corresponding to a type of a movement of the user from among a plurality of strings and display the same. The string selected by the wearable device 300-1, "I'm driving." 804 may be a string including a text 802 indicating the type of the movement of the user.

The wearable device 300-1 may display at least one string in a message input window 813 so that the user may edit at least one string selected based on the type of the movement of the user.

The wearable device 300-1 may transmit a message including the at least one string selected based on the type of the movement of the user, to a receiver device. The screen 810 includes a receiver display window 811 for displaying the receiver device to receive the message.

The wearable device 300-1 may transmit a message displayed on the message input window 813 to the receiver device displayed in the receiver display window 811 based on a user input for transmitting a message.

Referring to FIG. 9, the wearable device 300 according to an embodiment of the present disclosure may sense information related to a biometric signal of the user and determine whether the user is in danger due to a poor health state. As illustrated in FIG. 9, the wearable device 300 according to an embodiment of the present disclosure may be the wearable device 300-2 in the form of a smart watch. However, the form of the wearable device 300 according to various embodiments of the present disclosure is not limited to the forms illustrated in FIG. 9, and may include any number of various forms that can be worn on the body and/or clothing of the user.

FIG. 9 illustrates an example where the wearable device 300-2 senses for example, a blood pressure and a heart rate as information related to a biometric signal of the user but embodiments are not limited thereto. When the wearable device 300-2 determines that the user is in danger due to a poor health state based on a blood pressure and a heart rate of the user, the wearable device 300-2 may display a screen 910 illustrated in FIG. 9. Although blood pressure and heart rate of the user are illustrated as an example, the wearable device 300-2 may determine that the user is in danger due to a poor health state based on any number of detected conditions, such as blood glucose levels, blood oxygen levels, and so forth.

The wearable device 300-2 may select at least one string including a text notifying that the user is in danger due to a poor health state, from among a plurality of strings. The wearable device 300-2 may display at least one string selected based on state information of the user and the state information of the user. The wearable device 300-2 may display, as the state information of the user, information related to the biometric signal of the user and information related to a location of the user.

As illustrated in FIG. 9, the wearable device 300-2 may display a string 902 including a text notifying that the user is in danger due to a poor health state, information 904 related to a biometric signal of the user, and information 906 related to a location of the user.

The string 902 including a text notifying that the user is in danger due to a poor health state may include personal information of the user. For example, as illustrated in FIG. 9, the at least one string 902 including a text notifying that the user is in danger due to a poor health state may include the name 901 of the user. Alternatively, the string 902 including a text notifying that the user is in danger due to a poor health state may include information such as the age, identification information or gender of the user. When the string 902 including a text notifying that the user is in danger due to a poor health state includes personal information of the user, a receiver who receives a message including the string 902 selected by the wearable device 300-2 may quickly determine the identity of the user who is in danger due to a poor health state.

The wearable device 300-2 may display at least one string selected based on state information of the user and the state information of the user in a message input window 913 so that the user is able to edit at least one string selected based on the state information of the user and the state information of the user.

The wearable device 300-2 may transmit a message including the at least one string selected based on the state information of the user and the state information of the user to a receiver device. A screen 910 displayed by the wearable device 300-2 may include a receiver display window 911 for displaying the receiver device to receive the message.

The wearable device 300-2 may transmit a message including a text notifying that the user is in danger due to a poor health state, to a previously designated receiver device. FIG. 9 illustrates an example where a message including a text notifying that the user is in danger due to a poor health state is sent to a hospital of the user but embodiments are not limited thereto. The receiver device that receives the message may be modified based on a user input.

The wearable device 300-2 may transmit a message displayed in the message input window 913 to the receiver device displayed on the receiver display window 911 based on a user input for transmitting a message. Thus, the user using the wearable device 300-2 according to an embodiment of the present disclosure may easily transmit a message notifying that the user is in danger due to a poor health state, to the previously designated receiver device without having to write a message him/herself in an emergency.

Meanwhile, the wearable device 300 according to an embodiment of the present disclosure may select a string set including some of a plurality of strings. For example, the wearable device 300 may select a string set based on at least one of state information of the user, a touch input by the user, schedule information of the user, and information about a receiver device.

The wearable device 300 may display strings included in the selected string set. The wearable device 300 may receive a user input for selecting at least one of the strings included in the selected string set. The wearable device 300 may transmit a message including at least one string selected based on the received user input to the receiver device.

FIG. 10 is a diagram for explaining a method of displaying a string set that is selectable by a user according to an embodiment of the present disclosure.

Referring to FIG. 10, the wearable device 300 according to an embodiment of the present disclosure may be the wearable device 300-2 in the form of a smart watch. However, the wearable device 300 according to various embodiments of the present disclosure is not limited to the form illustrated in FIG. 10 and may include any number of various wearable forms that can be worn on the body and/or clothing of the user.

FIG. 10 illustrates an example in which the wearable device 300-2 according to an embodiment of the present disclosure transmits a message to a receiver device in response to a message received from a device whose identification is stored as "Mom".

Upon receiving a message, the wearable device 300-2 according to an embodiment of the present disclosure may display a screen 1010 illustrated in FIG. 10. The screen 1010 may include a sender display window 1011 displaying a sender device that has transmitted a received message. The screen 1010 may include a message display window 1013 displaying a text of the received message.

The wearable device 300-2 may receive a touch input for generating a screen to write a response message to a message received from a user. For example, when a touch input by the hand 7 of the user for touching the screen 1010 is received, the wearable device 300-2 may display a screen 1020 for writing a response message to the message displayed on the screen 1010.

The wearable device 300-2 may select a string set including some of a plurality of strings and display the selected string set. For example, the wearable device 300-2 may select a string set based on at least one of state information of the user, a type of a touch gesture of the user, schedule information of the user, and information about a receiver device. The screen 1020 may include a message input window 1023 displaying the selected string set. Also, the screen 1020 may include a receiver display window 1021 displaying the receiver device.

FIG. 10 illustrates an example where the wearable device 300-2 selects a string set based on information about a receiver device. In FIG. 10, the receiver device may be a device corresponding to contact information stored as "Mom" which has transmitted the message illustrated in the screen 1010.

The wearable device 300-2 may select a string set including strings corresponding to the receiver device and display the selected string set.

For example, the wearable device 300-2 may respectively map string sets corresponding to various devices with a corresponding device and store the mapped string set. The wearable device 300-2 may select and display a string set including strings corresponding to a receiver device to which a message is to be transmitted.

As another example, the wearable device 300-2 may analyze past messages that have been transmitted to devices. The wearable device 300-2 may respectively map a string set including strings that have been frequently transmitted to devices with a corresponding device, and store the mapped string set. The wearable device 300-2 may select a string set including strings corresponding to a receiver device to which a message is to be transmitted, based on an analyzed result of the past message, and display the string set.

The wearable device 300-2 may receive a user input for selecting at least one of the strings displayed in the message input window 1023. A UI 1008 for receiving a user input for selecting at least one of displayed strings may be provided in the message input window 1023. As illustrated in FIG. 10, the wearable device 300-2 may receive a touch input for selecting at least one string by the hand 7 of the user, via the UI 1008. The wearable device 300-2 may transmit a message including at least one string selected based on the received user input, to the receiver device.

When a user input for writing a response message to a received message is received, the wearable device 300-2 may analyze a text of the received message and select a string that is appropriate for the text of the received message and recommend the same to the user.

For example, when the wearable device 300-2 determines that a question is included in the received message, the wearable device 300-2 may select a string indicating a positive answer to the question and/or a string indicating a negative answer to the question from among a plurality of strings and display the selected string. When a question is included in the received message as illustrated in the message display window 1013 of FIG. 10 (for example, when a question mark (?) is included in the received message), the wearable device 300-2 may select and display "yes" which is a string indicating a positive answer and "no" which is a string indicating a negative answer. The wearable device 300-2 may receive a user input for selecting at least one of the strings displayed in the message input window 1023.

Thus, the user who is using the wearable device 300-2 according to an embodiment of the present disclosure does not have to input an answer to the question included in the received message by himself or herself. The user who is using the wearable device 300-2 according to an embodiment of the present disclosure may easily transmit a response message to the received message just by selecting a displayed string.

FIG. 11 is a flowchart of a method of transmitting a message based on a touch input at a wearable device according to an embodiment of the present disclosure.

Referring to FIG. 11, operations of the method may be performed by using the elements of the wearable device 300 illustrated in FIG. 3, 4, or 5, and descriptions provided above with reference to FIG. 3, 4, or 5 will be omitted here. Also, operations S1110 and S1130 of FIG. 11 respectively correspond to operations S610 and S630 of FIG. 6, and corresponding descriptions provided with reference to FIG. 6 will be omitted here.

In operation S1110, the wearable device 300 according to an embodiment of the present disclosure may receive a touch input from a user.

The touch input received from the user may include, for example, a touch input for generating a screen to write a new message, a touch input for selecting a receiver device to which a message is to be transmitted, or a touch input for generating a screen to write a response message to a received message.

In operation S1120, the wearable device 300 according to an embodiment of the present disclosure may display at least one string selected based on the touch input of the user from among a plurality of strings.

A touch input, which is a reference for the wearable device 300 to select at least one string, may be a touch input received in operation S1110 or a touch input additionally received in operation S1120. The touch input received from the user may include various touch gestures. The wearable device 300 may receive a touch input of the user via the touch input unit 320, and determine what touch gesture the touch input of the user includes.

Examples of the touch gesture include a tap, a touch & hold, a drag, and/or a swipe gesture but embodiments are not limited thereto.

A "Tap" gesture denotes a gesture of a user touching a screen by using a pointing object and immediately lifting the pointing object from the screen.

A "Touch & hold" gesture denotes a gesture in which a user touches a screen by using a pointing object and maintains the touch for more than a predetermined time period.

A "Drag" gesture denotes a gesture of a user touching a screen with a pointing object and moving the pointing object to other positions on the screen while touching the screen.

A "Swipe" gesture denotes a gesture of a user sliding a pointing object in a direction.

However, the touch gesture that a wearable device according to various embodiments of the present disclosure may recognize are not limited to the above-described touch gestures. For example, the wearable device 300 may also recognize a touch gesture of drawing a geometrical figure or symbol, or a touch gesture of writing a character.

The wearable device 300 may map a plurality of touch gestures with a plurality of strings and store the same in advance. Upon receiving a touch input, the wearable device 300 may select at least one of a plurality of strings based on a type of the touch gesture determined as being included in the touch input.

FIG. 12 illustrates an example of strings mapped with a touch gesture according to an embodiment of the present disclosure.

Referring to FIG. 12, a touch gesture 1201 of moving a pointing object to the left or right may be mapped with a string "Miss you" and stored. A touch gesture 1203 of drawing a circle by using a pointing object may be mapped with a string "I'm alright" and stored. A touch gesture 1205 of touching a screen with two pointing objects (for example, two fingers) may be mapped with a string "Kiss" and stored. A touch gesture 1207 of touching a screen with one pointing object (for example, the index finger) may be mapped with a string "Cheer up" and stored. A touch gesture 1209 of drawing a V shape by using a pointing object may be mapped with a string "Hi" and stored. A touch gesture 1211 of drawing a zigzag line from a left upper end to a right lower end may be mapped with a string "I'm going to call you later" and stored.

However, touch gestures and strings stored by the wearable device 300 according to an embodiment of the present disclosure are not limited to the touch gestures illustrated in FIG. 12. The wearable device 300 may also map the touch gestures illustrated in FIG. 12 with other strings and store the same, and touch gestures that are not shown in FIG. 12 may also be mapped with other various strings not described in FIG. 12 and stored.

It is usually difficult to provide a touch panel having a sufficient size in a wearable device for a virtual keyboard for a user to type a text message. Thus, the wearable device 300 according to an embodiment of the present disclosure may select and display a string based on a touch gesture received from the user, thereby reducing the effort of the user to directly input strings by himself or herself.

Returning to FIG. 11, in operation S1130, the wearable device 300 according to an embodiment of the present disclosure may transmit a message including at least one string selected in operation S1120 to a receiver device. The wearable device 300 may transmit a message including the selected at least one string and a string additionally input by the user, to the receiver device.

Figure 13:
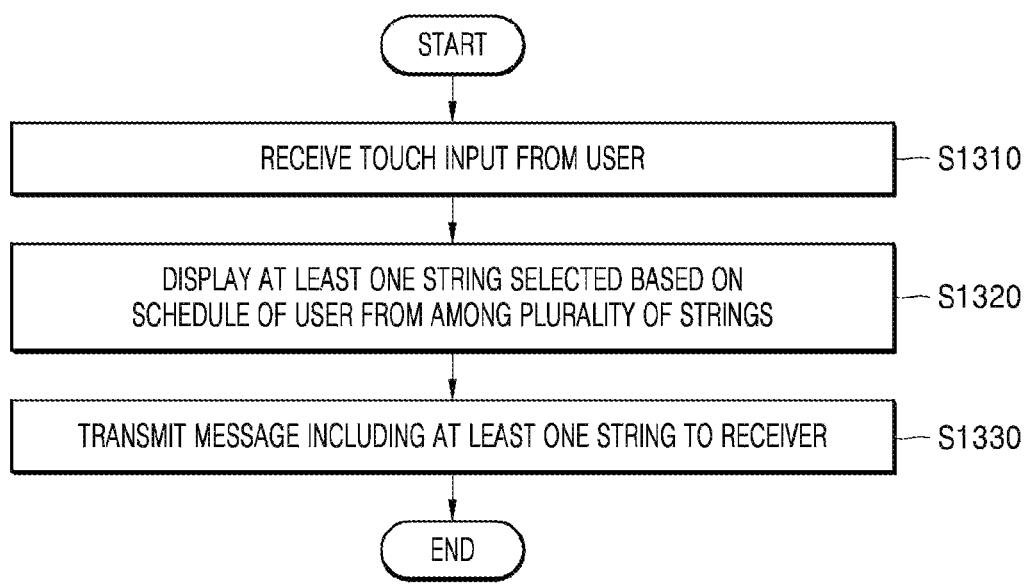
FIG. 13 is a flowchart of a method of transmitting a message based on a schedule of a user from a wearable device according to an embodiment of the present disclosure.

FIG. 13 is a flowchart of a method of transmitting a message based on a schedule of a user at a wearable device according to an embodiment of the present disclosure.

Referring to FIG. 13, operations of the method may be performed by using the elements of the wearable device 300 illustrated in FIG. 3, 4, or 5, and description provided above with reference to FIG. 3, 4, or 5 will be omitted here. Also, operations S1310 and S1330 of FIG. 13 respectively correspond to operations S610 and S630 of FIG. 6, and corresponding description provided with reference to FIG. 6 will be omitted here.

In operation S1310, the wearable device 300 according to an embodiment of the present disclosure may receive a touch input from a user.

The touch input received from the user may include, for example, a touch input for generating a screen to write a new message, a touch input for selecting a receiver device to which a message is to be transmitted, or a touch input for generating a screen to write a response message to a received message.

In operation S1320, upon receiving a touch input, the wearable device 300 according to an embodiment of the present disclosure may display at least one string selected based on a schedule of the user, from among a plurality of strings.

When a touch input is received, the wearable device 300 may obtain a schedule of the user from the memory 570. Alternatively, when a touch input is received, the wearable device 300 may receive a schedule of the user from another electronic device or a server and store the same in the memory 570. Alternatively, the wearable device 300 may obtain schedule information of the user at predetermined time intervals and store the same in the memory 570. When a touch input is received, the wearable device 300 may obtain schedule information corresponding to a time when the touch input is received.

Schedule information of the user may include plans of the user including things to be done, according to dates and times. Schedule information of the user may include starting times and/or end times of things to be done by the user. In regard to the things to be done by the user, schedule information of the user may further include information about locations where the user is to be according to dates and times. For example, the wearable device 300 may store information indicating that the user has to be at a meeting in office B from 2 pm to 4 pm on Nov. 3, 2014, as schedule information of the user.

The wearable device 300 may select at least one of a plurality of strings based on schedule information of the user. The wearable device 300 may display the at least one string selected based on the schedule information of the user.

The wearable device 300 may determine whether the user is able to operate the wearable device 300 or not based on schedule information of the user. When the wearable device 300 determines that the user is not able to operate the wearable device 300, the wearable device 300 may select a string including a text indicating that an incoming call cannot be answered or a string including a text indicating that a response cannot be immediately sent to a received message.

The wearable device 300 may select at least one string corresponding to a type of things to be done by the user from among a plurality of strings based on a type of the things to be done by the user included in the schedule information of the user.

For example, when the wearable device 300 determines that the user is in a meeting based on schedule information of the user, the wearable device 300 may select a string including a text indicating that the user is in a meeting. Alternatively, when the wearable device 300 determines that the user is on vacation, the wearable device 300 may select a string including a text indicating that the user is on vacation.

The wearable device 300 may select at least one string corresponding to a starting time and/or an end time of things to be done by the user, from among a plurality of strings. For example, when the wearable device 300 determines that the current user is in a meeting based on schedule information of the user, the wearable device 300 may select a string including a starting time and an end time of the meeting in addition to a text indicating that the user is in a meeting. Alternatively, the wearable device 300 may select a string including a text indicating in a reply that the user will call after the end time of the current meeting.

The wearable device 300 may display at least one string selected from among a plurality of strings. The wearable device 300 may display the selected at least one string in a message input window so that the user may edit the selected at least one string.

The wearable device 300 may further obtain information related to a location of the user and transmit a message to a receiver device including a string selected based on schedule information of the user and a text indicating the location of the user. For example, the wearable device 300 may determine that the user is on vacation based on schedule information of the user, and may further obtain information indicating that the location of the user is abroad. The wearable device 300 may transmit a message to a receiver device including a string including a text indicating that the user is on vacation and a text indicating that the user is abroad.

The wearable device 300 may also display a string set including strings corresponding to schedule information of the user from among a plurality of strings. The wearable device 300 may provide a UI allowing the user to select at least one string from among strings included in the displayed string set.

For example, the wearable device 300 may display a string set including at least one of a string including a text indicating that the user cannot respond to a communication based on schedule information of the user (for example, a text indicating that an incoming call cannot be answered or a response cannot be sent to a received message), a string including a text indicating that the user will call after an end of current business of the user, and a string set including at least one of the strings including schedule information of the user (for example, a starting time and an end time of business of the user and a location of the business of the user).

Also, the wearable device 300 may provide a UI allowing the user to check whether a string selected and displayed by the wearable device 300 is a string that the user intends to write. When a user input indicating that the selected string is not a string that the user intends to write is received, the wearable device 300 may automatically select and display another string or select and display another string based on a user input.

Returning to FIG. 13, in operation S1330, the wearable device 300 according to an embodiment of the present disclosure may transmit a message including at least one string selected in operation S1320, to a receiver device. The wearable device 300 may transmit a message including the selected at least one string and a string additionally input by the user to receiver device.

When the wearable device 300 displays a string set in operation S1320, the wearable device 300 may receive a user input for selecting at least one of the strings included in a string set. The wearable device 300 may transmit a message including the at least one string selected by the user based on the user input for selecting at least one string, to a receiver device.

The wearable device 300 may determine a receiver device based on a user input for selecting a receiver device in operation S1330.

Alternatively, the wearable device 300 may transmit a message to a designated receiver device based on a user input in operation S1310.

For example, in operation S1310, the wearable device 300 may receive a touch input for selecting a receiver device to which a message is to be transmitted. The wearable device 300 may transmit a message to the receiver device selected by the user. Alternatively, in operation S1310, the wearable device 300 may receive a touch input for generating a screen to write a response message to a received message or a touch input for generating a screen to write a response message to an incoming call. For example, when writing a response message to a received message or an incoming call, the wearable device 300 may determine a device that has transmitted the received message or made the call as a receiver device to receive a newly written message.

Figure 14:
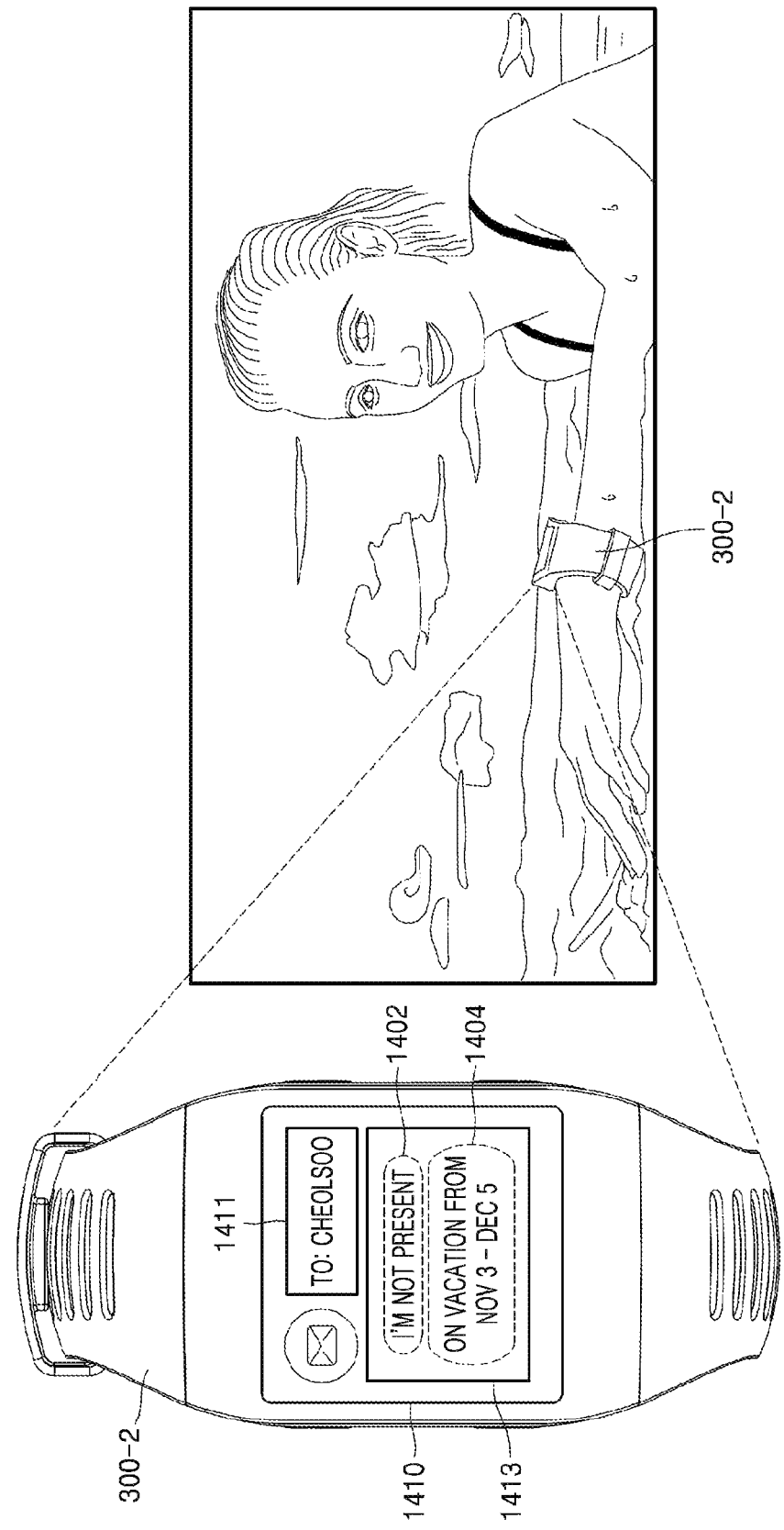
FIG. 14 is a diagram for explaining a method of displaying a string selected based on a schedule of a user from among a plurality of strings according to an embodiment of the present disclosure.

FIG. 14 is a diagram for explaining a method of displaying a string selected based on a schedule of a user, from among a plurality of strings according to an embodiment of the present disclosure.

Referring to FIG. 14, the wearable device 300 according to an embodiment of the present disclosure may be the wearable device 300-2 in the form of a smart watch. However, the form of the wearable device 300 according to various embodiments of the present disclosure is not limited to the forms illustrated in FIG. 14, and may include any number of various forms that can be worn on the body and/or clothing of the user.

FIG. 14 illustrates an example where the wearable device 300-2 has determined that the user is on vacation based on schedule information of the user. When it is determined that the user is on vacation, the wearable device 300-2 may display a screen 1410 illustrated in FIG. 14.

The wearable device 300-2 may select at least one string corresponding to a schedule of the user corresponding to a predetermined time from among a plurality of strings that are mapped with various schedules and stored in advance, based on schedule information of the user. The wearable device 300-2 may display the selected at least one string.

For example, the wearable device 300-2 may store a plurality of strings including words related to types of schedules of the user. The wearable device 300-2 may determine whether the user is working or is away based on types of schedules of the user. When it is determined that the user is away, the wearable device 300 may select and display a string 1402 including a text indicating that the user is away.

Alternatively, the wearable device 300-2 may select and display a string corresponding to a schedule of the user. The wearable device 300-2 may select at least one string corresponding to a starting time and an end time of a schedule of the user from among a plurality of strings. The wearable device 300-2 may select and display a string 1404 including a text indicating a starting time and an end time of vacation of the user based on schedule information of the user.

The wearable device 300 may display the selected at least one string in a message input window 1413 so that the user may edit the selected at least one string.

The wearable device 300-2 may transmit a message including at least one string selected based on schedule information of the user, to a receiver device. The screen 1410 includes a receiver display window 1411 for displaying the receiver device to receive the message.

The wearable device 300-2 may set a receiver device based on a user input. For example, when a user input for writing a response message to a received message is received, the wearable device 300-2 may set a sender device that has transmitted the received message as a receiver device. Alternatively, when a user input for writing a response message to an incoming call is received, the wearable device 300-2 may set a sender device that has made the call as a receiver device. Alternatively, the wearable device 300-2 may determine a receiver device based on a user input for selecting contact information included in a previously stored telephone book.

The wearable device 300-2 may transmit a message displayed in the message input window 1413 to the receiver device displayed in the receiver display window 1411 based on a user input for transmitting the message.

Figure 15:
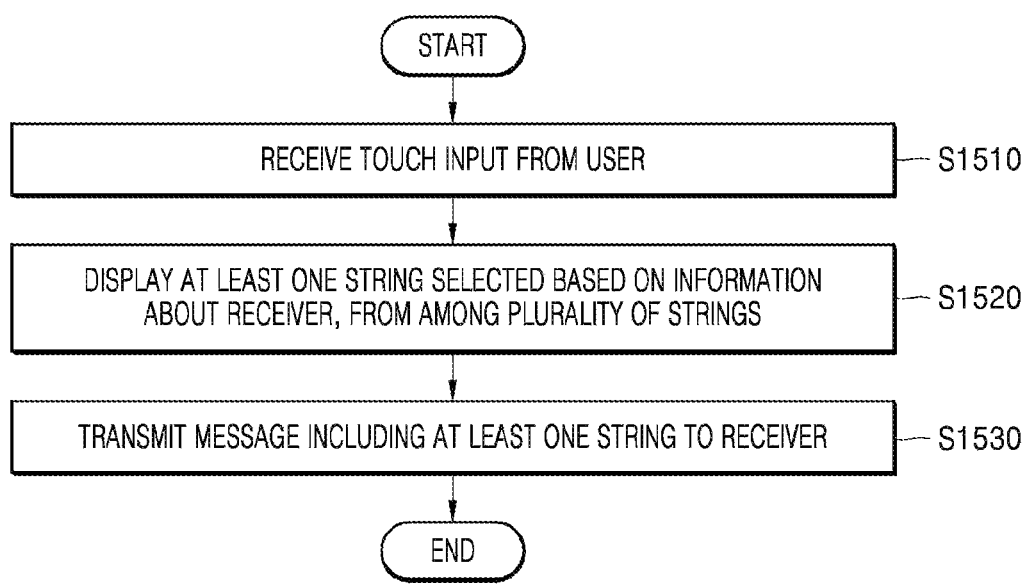
FIG. 15 is a flowchart of a method of transmitting a message based on information about a receiver device from a wearable device according to an embodiment of the present disclosure.

FIG. 15 is a flowchart of a method of transmitting a message based on information about a receiver device, at a wearable device according to an embodiment of the present disclosure.

Referring to FIG. 15, operations of the method may be performed by using the elements of the wearable device 300 illustrated in FIG. 3, 4, or 5, and descriptions provided above with reference to FIG. 3, 4, or 5 will be omitted here. Also, operations S1510 and S1530 of FIG. 15 respectively correspond to operations S610 and S630 of FIG. 6, and corresponding description provided with reference to FIG. 6 will be omitted here.

In operation S1510, the wearable device 300 according to an embodiment of the present disclosure may receive a touch input from a user.

The touch input received from the user may include, for example, a touch input for generating a screen to write a new message, a touch input for selecting a receiver device to which a message is to be transmitted, or a touch input for generating a screen to write a response message to a received message. When a touch input is received, the wearable device 300 may display a screen to write a message.

The wearable device 300 may determine a receiver device to which a newly written message is to be transmitted, based on a user input.

For example, the wearable device 300 may determine a receiver device based on a touch input for selecting a receiver device to which a message is to be transmitted.

The touch input for selecting a receiver device to which a message is to be transmitted may include a touch input for selecting contact information displayed based on a previously stored telephone book. The wearable device 300 may transmit a newly written message to a device corresponding to the selected contact information.

Alternatively, the wearable device 300 may store a telephone book including contact information and images respectively corresponding to the contact information. In this case, a touch input for selecting a receiver device to which a message is to be transmitted, may include a touch input for selecting at least one of images displayed based on a previously stored telephone book. The wearable device 300 may transmit a newly written message to a device that is connected via contact information corresponding to the selected image.

As another example, the wearable device 300 may determine a receiver device based on a touch input for generating a screen to write a response message to a received message or a touch input for generating a screen to write a response message to an incoming call. When a touch input for generating a screen to write a response message to a received message or a touch input for generating a screen to write a response message to an incoming call is received, the wearable device 300 may determine a device that has transmitted the received message or made the call as a receiver device.

In operation S1520, when the touch input is received, the wearable device 300 according to an embodiment of the present disclosure may display at least one string selected based on information about the receiver device, from among a plurality of strings.

The wearable device 300 may receive a user input for determining a receiver device. The wearable device 300 may determine a receiver device based on a user input for inputting a receiver device in a receiver device display window included in a screen for writing a message. For example, the wearable device 300 may search for contact information from a previously stored telephone book based on a user input, and may determine a device corresponding to the found contact information as a receiver device.

When a touch input is received, the wearable device 300 may obtain information about a receiver device from the memory 570. Alternatively, when a touch input is received, the wearable device 300 may receive information about a receiver device from another electronic device or a server.

Information about a receiver device may include intimacy information indicating a degree of relationship between a user of the receiver device and the user of the wearable device 300. For example, the wearable device 300 may store contact information and intimacy information of contact information. Intimacy information of contact information refers to intimacy information between a user of a device corresponding to the contact information and the user of the wearable device 300. Intimacy information between the user of the device corresponding to contact information and the user of the wearable device 300 may be set based on a user input.

The wearable device 300 may select at least one of a plurality of strings based on information about the receiver device. The wearable device 300 may display the selected at least one string based on information about the receiver device.

For example, the wearable device 300 may select at least one string corresponding to intimacy information about the receiver device.

As another example, the wearable device 300 may map at least one string and store with respect to contact information. The wearable device 300 may select at least one string mapped with contact information corresponding to a device determined as a receiver device from among a plurality of strings.

Also, information about a receiver device may include a record about strings included in past messages transmitted from the wearable device 300 to the receiver device. The wearable device 300 may select at least one of a plurality of strings based on the records about strings included in the past messages.

The wearable device 300 may analyze past messages that have been transmitted to devices. The wearable device 300 may map at least one string that was frequently transmitted to devices to the corresponding devices and store the same. The wearable device 300 may select at least one string that was frequently transmitted to the receiver device based on a record about strings included in the past messages.

The wearable device 300 may display at least one string selected in a message input window so that the user may edit the selected at least one string.

The wearable device 300 may display a string set including strings corresponding to information about a receiver device from among a plurality of strings. The wearable device 300 may provide a UI allowing the user to select at least one of the strings included in the displayed string set.

Also, the wearable device 300 may provide a UI allowing the user to check whether the string selected and displayed by the wearable device 300 is a string that the user intends to write. When a user input indicating that the selected string is not a string that the user intends to write is received, the wearable device 300 may automatically select and display another string or select and display another string based on a user input.

Returning to FIG. 15, in operation S1530, the wearable device 300 according to an embodiment of the present disclosure may transmit a message including at least one string selected in operation S1520, to a receiver device.

The wearable device 300 may transmit a message including the selected at least one string and a string additionally input by the user, to the receiver device.

When the wearable device 300 displays a string set in operation S1520, the wearable device 300 may receive a user input for selecting at least one of the strings included in the string set. The wearable device 300 may transmit a message including at least one string selected by the user based on a user input for selecting at least one string, to the receiver device.

Figure 16:
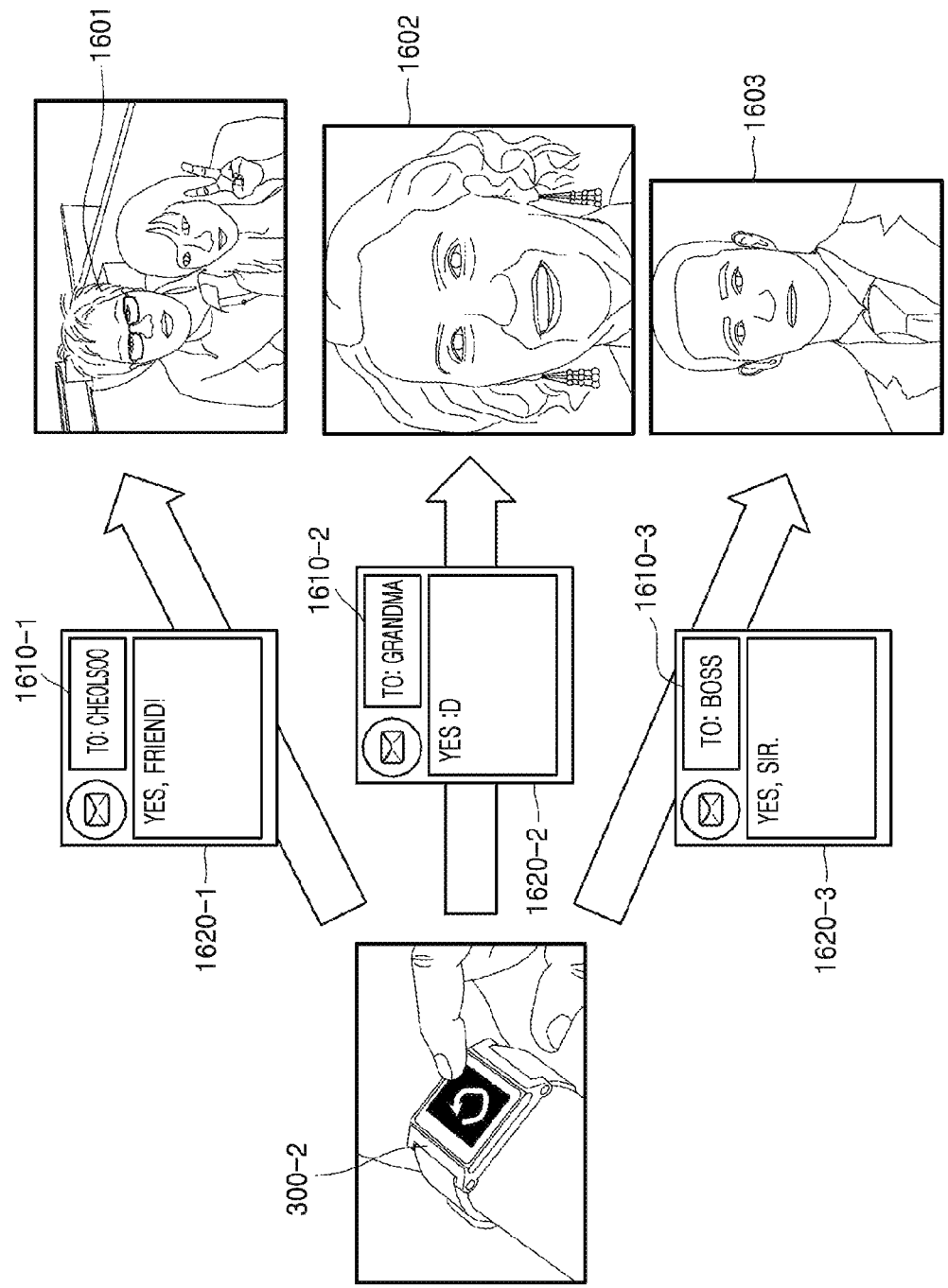
FIGS. 16 and 17 are diagrams for explaining a method of displaying a string selected based on information about a receiver device from among a plurality of strings according to an embodiment of the present disclosure.
Figure 17:
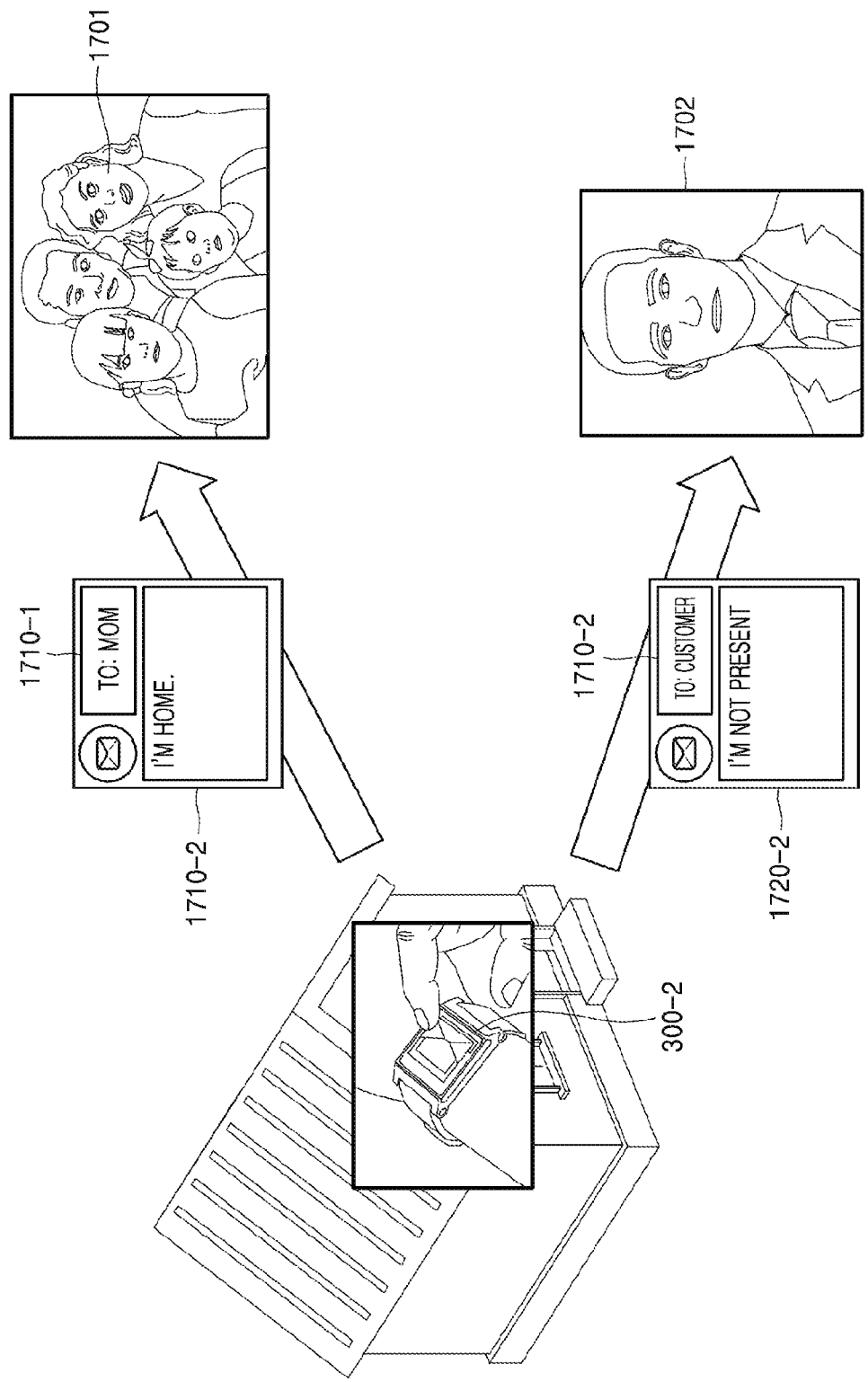

FIGS. 16 and 17 are diagrams for explaining a method of displaying a string selected based on information about a receiver device from among a plurality of strings according to an embodiment of the present disclosure.

Referring to FIGS. 16 and 17, the wearable device 300 according to an embodiment of the present disclosure may be the wearable device 300-2 in the form of a smart watch. However, the form of the wearable device 300 according to various embodiments of the present disclosure is not limited to the forms illustrated in FIGS. 16 and 17, and may include any number of various forms that can be worn on the body and/or clothing of the user.

FIG. 16 illustrates an example where the wearable device 300-2 selects at least one of a plurality of strings based on information about various receiver devices (e.g., a device used by a friend, a device used by a family member, or a device used by a boss). When a touch input is received, the wearable device 300-2 may select at least one string based on information about a receiver device. For example, as illustrated in FIG. 16, when a touch gesture of drawing a circle by using a pointing object is input, the wearable device 300-2 may select a string including a text of a positive answer based on the information about the receiver device.

As shown in FIG. 16, when a device corresponding to contact information stored as "Cheolsoo" 1601 is determined as a receiver device, the wearable device 300-2 may display a screen 1620-1. A receiver display window 1601-1 displaying the receiver device of a message is included in the screen 1620-1.

For example, the wearable device 300-2 may select and display "Yes, friend!" which is at least one string corresponding to "Cheolsoo" from among a plurality of strings based on the information about the receiver device. As another example, the wearable device 300 may select and display "Yes, friend!" which is at least one string corresponding to intimacy information of a group 'friend' based on intimacy information of contact information stored as "Cheolsoo" included in the group 'friend.'

Next, when a device corresponding to contact information stored as "Grandma" 1602 is determined as a receiver device, the wearable device 300-2 may display a screen 1620-2. A receiver display window 1610-2 displaying the receiver device for receiving a message is included in the screen 1620-2.

For example, the wearable device 300-2 may select and display "Yes:D" which is at least one string corresponding to "Grandma" from among a plurality of strings based on the information about the receiver device. As another example, the wearable device 300-2 may select and display "Yes:D" which is at least one string corresponding to intimacy information of a group 'family' based on intimacy information corresponding to contact information stored as "Grandma" included in the group 'family.'

Next, when a device corresponding to contact information stored as "boss" 1603 is determined as a receiver device, the wearable device 300-2 may display a screen 1620-3. A receiver display window 1610-3 displaying the receiver device for receiving a message is included in the screen 1620-3.

For example, the wearable device 300-2 may select and display "Yes, sir." which is at least one string corresponding to "boss" from among a plurality of strings, based on information about the receiver device. As another example, the wearable device 300-2 may select and display "Yes, sir." which is at least one string corresponding to intimacy information of a group "boss" based on intimacy information of contact information stored as "boss" included in the group "boss."

FIG. 17 illustrates an example where the wearable device 300-2 selects at least one of a plurality of strings based on information about various receiver devices (for example, a device used by a family member or a device used by a customer).

When a touch input is received, the wearable device 300-2 may select at least one string based on information about a receiver device together with state information of the user. The wearable device 300-2 may obtain, as state information of the user, at least one of information about a movement of the user, information about a location of the user, and information about a biometric signal of the user.

For example, the wearable device 300-2 may select strings including a text indicating a location of the user from among a plurality of strings, based on information about the location of the user. The wearable device 300-2 may select at least one of the strings that are selected based on the information about the location of the user by further considering information about a receiver device.

As illustrated in FIG. 17, when it is determined that the user is "at home" and a device corresponding to contact information stored as "Mom" 1701 is determined as a receiver device, the wearable device 300-2 may display a screen 1710-2. A receiver display window 1710-1 displaying the receiver device to receive a message is included in the screen 1710-2.

The wearable device 300-2 may determine that the user is "at home" and select strings corresponding to when the user is "at home" from among a plurality of strings. The wearable device 300-2 may select at least one of the strings corresponding to the information about the location of the user based on the information about the receiver device.

For example, based on the information about the receiver device, the wearable device 300-2 may select and display "I'm home." which is at least one string corresponding to "Mom" from among strings corresponding to the information about the location of the user. As another example, the wearable device 300-2 may select and display "I'm home." which is at least one string corresponding to intimacy information of the group 'family' based on intimacy information of contact information stored as "Mom" included in the group 'family.'

When it is determined that the user is "at home" and a device corresponding to contact information stored as a "customer" 1702 is determined as a receiver device, the wearable device 300-2 may display a screen 1720-2. A receiver display window 1710-2 displaying the receiver device to receive a message is included in the screen 1720-2.

The wearable device 300-2 may determine that the user is "at home" and select strings corresponding to when the user is "at home" from among a plurality of strings. The wearable device 300-2 may select at least one of the strings corresponding to information about a location of the user based on the information about the receiver device.

For example, the wearable device 300-2 may select and display "I'm not present." which is at least one string corresponding to a "customer" from among strings corresponding to the information about the location of the user based on the information about the receiver device. As another example, the wearable device 300-2 may select and display "I'm not present." which is at least one string corresponding to intimacy information of a group "business" based on intimacy information of contact information stored as the "customer" included in the group "business."

The user may feel comfortable about transmitting a message notifying that the user is in a private space (for example, at home), to devices corresponding to contact information included in the group "family." On the other hand, the user may not wish to open his or her private life to devices corresponding to contact information included in the group "business."

Thus, when it is determined that the user is in a private space, the wearable device 300-2 may select a string including a text notifying a location of the user with respect to devices corresponding to contact information included in the group 'family.' On the other hand, when it is determined that the user is in a private space (for example, home), the wearable device 300-2 may select a string including a text indicating that the user is not at work with respect to devices corresponding to contact information included in the group "business."

As described above, the wearable device 300 according to an embodiment of the present disclosure may select and display at least one of the strings by considering information about a receiver device in addition to state information of the user. Thus, the wearable device 300 may select and display different strings according to different receiver devices also when the user is in the same state (that is, if state information of the user is identical).

Thus, the wearable device 300 according to an embodiment of the present disclosure may allow the user to easily transmit a message by providing a predictive text message that is a message intended by the user, based on state information of the user and the receiver device.

Figure 18:
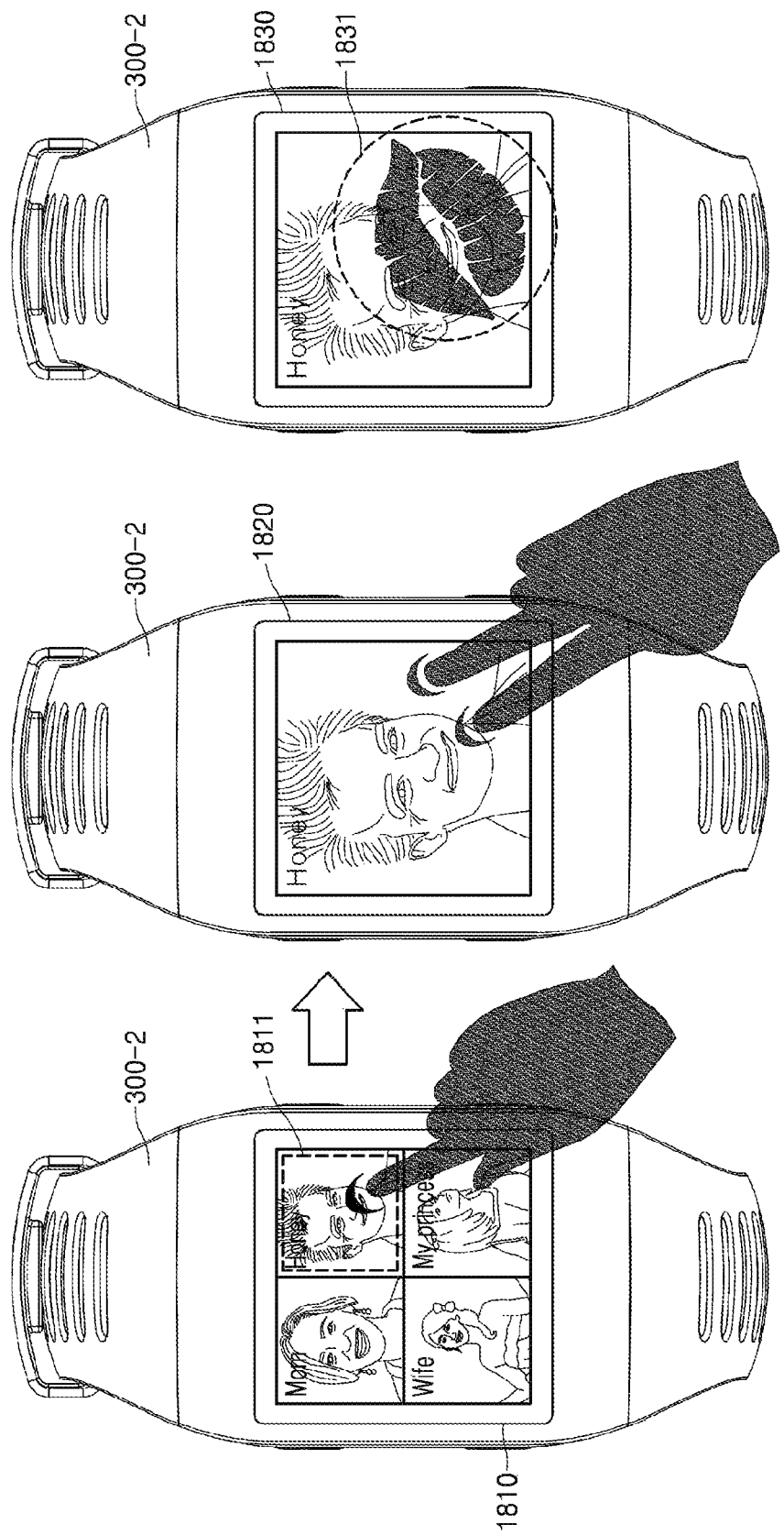
FIG. 18 is a diagram for explaining a method of transmitting a message by selecting a receiver device according to an embodiment of the present disclosure.

FIG. 18 is a diagram for explaining a method of transmitting a message by selecting a receiver device according to an embodiment of the present disclosure.

Referring to FIG. 18, the wearable device 300 according to an embodiment of the present disclosure may be the wearable device 300-2 in the form of a smart watch. However, the wearable device 300 according to various embodiments of the present disclosure is not limited to the form illustrated in FIG. 18, and may include any number of various forms that can be worn on the body and/or clothing of the user.

FIG. 18 illustrates an example where the wearable device 300-2 stores a telephone book including contact information and images respectively corresponding to the contact information.

As illustrated in a screen 1810, the wearable device 300-2 may display a plurality of images corresponding to contact information based on a previously stored telephone book. Images corresponding to contact information may be stored according to a user input in advance. For example, images corresponding to contact information may include pictures of users of devices corresponding to corresponding contact information. The wearable device 300-2 may display a name corresponding to each contact information together with a plurality of images corresponding to a plurality of contact information. The name corresponding to the contact information may be stored by a user input in advance.

The wearable device 300-2 may receive a touch input from a user for selecting an image 1811 from among displayed images. The wearable device 300-2 may transmit a newly written message to a device corresponding to contact information corresponding to the selected image 1811.

As illustrated in a screen 1820, the wearable device 300-2 may expand and display the selected image 1811. The wearable device 300-2 may receive a touch input by a user regarding the screen 1820. The wearable device 300-2 may determine which touch gesture the touch input by the user includes.

For example, as illustrated in FIG. 18, the wearable device 300-2 may map a gesture of touching a screen with two pointing objects (for example, two fingers) with a string "Kiss" and store the same. The wearable device 300-2 may select the string "Kiss" based on the touch gesture received from the user.

The wearable device 300-2 may display the selected string based on the touch gesture received from the user. The wearable device 300-2 may also display the string selected based on the touch gesture received from the user as an image 1831 as illustrated in a screen 1830.

The wearable device 300 may transmit a message including the selected string to a receiver device. The receiver device that has received a message including the selected string "Kiss" may display the string "Kiss" included in the received message as a text or as the image 1831 as illustrated in the screen 1830.

Figure 19:
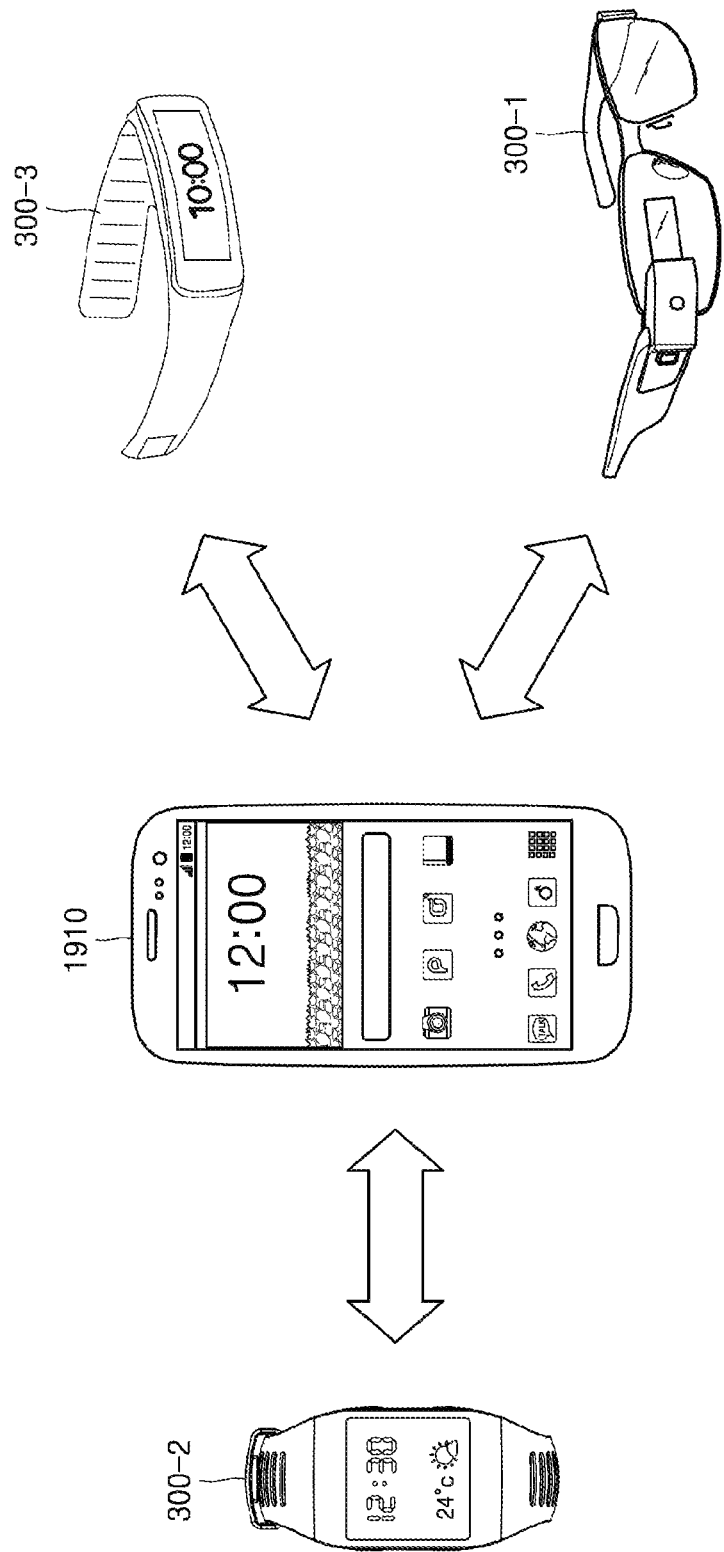
FIG. 19 is a diagram illustrating a system in which a wearable device operates in connection with other electronic devices according to an embodiment of the present disclosure.

FIG. 19 is a diagram illustrating a system in which a wearable device 300 operates in connection with a mobile phone 1910 according to an embodiment of the present disclosure.

The wearable device 300 according to an embodiment of the present disclosure may operate in a stand-alone configuration, or in connection with one or more external electronic devices and/or networks. When the wearable device 300 operates with an external electronic device, some or all of the functions performed by at least one of the sensing unit 310, the communicator 340, and the controller 350 of the wearable device 300 may be performed by the external electronic devices.

Referring to FIG. 19, the wearable device 300 according to an embodiment of the present disclosure is illustrated as the wearable device 300-1 in the form of smart glasses, the wearable device 300-2 in the form of a smart watch, and the wearable device 300-3 in the form of a smart band. However, the form of the wearable device 300 according to various embodiments is not limited to the forms illustrated in FIG. 19, and may include any number of various forms that can be worn on the body and/or clothing of the user. As illustrated in FIG. 19, the wearable devices 300-1, 300-2, and 300-3 may operate in connection with the mobile phone 1910.

While FIG. 19 illustrates an example where the wearable devices 300-1, 300-2, and 300-3 according to an embodiment of the present disclosure operate in connection with the mobile phone 1910, the wearable devices 300-1, 300-2, and 300-3 are not limited to the embodiment in which they are connected to the mobile phone 1910. For example, the wearable devices 300-1, 300-2, and 300-3 according to the present disclosure may operate in connection with a smart phone, a tablet personal computer (PC), a PC, a smart television (TV), a personal digital assistant (PDA), a laptop, a media player, a micro server, a GPS device, an e-book terminal, a digital broadcasting terminal, a navigation device, a kiosk, a Moving Picture Experts Group phase 1 or phase 2 (MPEG-1 or MPEG-2) audio layer 3 (MP3) player, a digital camera, and other mobile or non-mobile computing devices.

When a touch input is received from the user via the touch input unit 320, the wearable devices 300-1, 300-2, and 300-3 according to an embodiment of the present disclosure may transmit to the mobile phone 1910 information about the touch input and various information sensed from the wearable devices 300-1, 300-2, and 300-3. The wearable devices 300-1, 300-2, and 300-3 may receive from the mobile phone 1910 data obtained by processing information received from the wearable devices 300-1, 300-2, and 300-3. For example, the mobile phone 1910 may select at least one of a plurality of strings based on the information received from the wearable devices 300-1, 300-2, and 300-3, and transmit the selected at least one string to the wearable devices 300-1, 300-2, and 300-3. Also, the wearable devices 300-1, 300-2, and 300-3 may use the mobile phone 1910 to transmit a message including the selected at least one string to a receiver device. A method of operating the wearable device 300 according to an embodiment of the present disclosure in connection with an external electronic device will be described in more detail with reference to FIG. 20.

Figure 20:
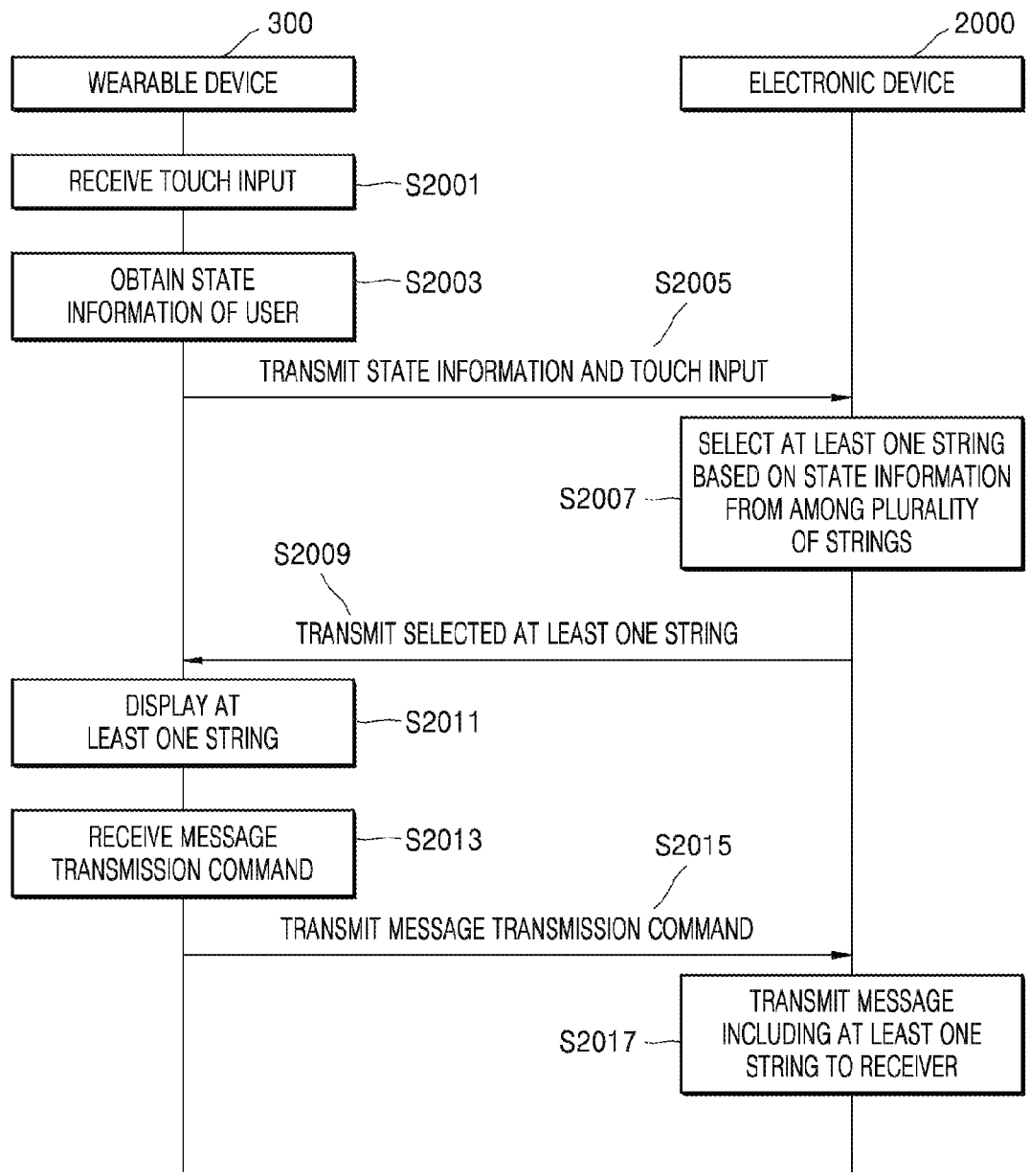
FIG. 20 is a signal flowchart for explaining a process of transmitting a message_from an electronic device based on state information of a user obtained by using a wearable device according to an embodiment of the present disclosure.

FIG. 20 is a signal flowchart for explaining a process of transmitting a message in an electronic device 2000 based on state information of a user obtained by using a wearable device 300 according to an embodiment of the present disclosure.

In operation S2001, the wearable device 300 may receive a touch input from the user. In operation S2003, the wearable device 300 may obtain state information of the user. When the touch input is received, the wearable device 300 may sense state information of the user. Alternatively, the wearable device 300 may sense and store state information of the user at predetermined time intervals, and when the touch input is received, the wearable device 300 may obtain state information of the user that is most recently stored.

In operation S2005, the wearable device 300 transmits to the electronic device 2000 the touch input received in operation S2001 and the state information of the user obtained in operation S2003. In operation S2007, the electronic device 2000 may select at least one string based on the state information of the user from among a plurality of strings that are stored in advance. The electronic device 2000 may map information about various states of the user with a plurality of strings and store the same.

In operation S2009, the electronic device 2000 may transmit the selected at least one string to the wearable device 300. In operation S2011, the wearable device 300 may display the received at least one string from the electronic device 2000. The wearable device 300 may provide a UI that allows the user to check whether the displayed at least one string is a string that the user intends to write. Also, the wearable device 300 may receive a user input for adding a string from the user.

In operation S2013, the wearable device 300 may receive a message transmission command from the user. That is, once it is determined that the displayed at least one string is a string that the user intends to write, the wearable device 300 may receive a message transmission command directing transmission of a message including the displayed at least one string, from the user.

In operation S2015, the wearable device 300 may transmit to the electronic device 2000 information indicating that it has received the message transmission command from the user. The wearable device 300 may also transmit information about a string added based on a user input, to the electronic device 2000.

In operation S2017, the electronic device 2000 may transmit to a receiver device a message including at least one string selected based on state information of the user from among a plurality of strings. The receiver device may be determined based on a user input received from the wearable device 300. The wearable device 300 may transmit to the receiver device a message including the at least one string selected based on the state information of the user from among a plurality of strings and a string additionally input by the user.

An embodiment of the inventive concept may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable device worn on a body of a user, the wearable device comprising:
   a touch input unit;
   a display;
   a communicator;
   a sensor configured to detect data related to a state of the user; and
   at least one processor configured to:
      receive a touch input from the user via the touch input unit,
      select at least one string from a plurality of strings based on the detected data related to the state of the user when the touch input is received, wherein the data is detected by the sensor of the wearable device and the selected at least one string is associated with a specific user movement of the detected data,
      display the selected at least one string through the display, and
      control the communicator to transmit a message including the selected at least one string to a receiver device.

2. The wearable device of claim 1, wherein the data related to the state of the user comprises at least one of data related to the movement of the user, data related to a location of the user, and data related to a biometric signal of the user.

3. The wearable device of claim 1,
   wherein the data related to the state of the user comprises at least one of data related to a location of the user and data related to a biometric signal of the user, and
   wherein the at least one processor is further configured to display information related to the state of the user and the selected at least one string through the display.

4. The wearable device of claim 1, wherein the at least one processor is further configured to:
   display a string set including strings corresponding to the state of the user from the plurality of strings,
   receive a user input for selecting at least one of the strings included in the string set via the touch input unit, and
   control the communicator to transmit the message including the selected at least one string to the receiver device based on the user input.

5. The wearable device of claim 1, wherein the at least one processor is further configured to:
   display the string selected based on the touch input from the plurality of strings and the at least one string selected based on the data related to the state of the user from the plurality of strings, and
   control the communicator to transmit the message including the string selected based on the touch input and the at least one string to the receiver device.

6. The wearable device of claim 1, wherein the at least one processor is further configured to:
   obtain information about a schedule of the user, and
   select the at least one string from the plurality of strings based on the data related to the state of the user and the information about the schedule.

7. The wearable device of claim 1, wherein the at least one processor is further configured to:
   obtain information about the receiver device, and
   select the at least one string from the plurality of strings based on the data related to the state of the user and the information about the receiver device.

8. The wearable device of claim 7,
   wherein the information about the receiver device comprises intimacy information indicating a relationship between the user and a user of the receiver device, and wherein the at least one processor is further configured to select the at least one string from the plurality of strings based on the data related to the state of the user and the intimacy information.

9. The wearable device of claim 7,
wherein the information about the receiver device comprises a record of strings included in past messages transmitted by the wearable device to the receiver device, and
wherein the at least one processor is further configured to select the at least one string from the plurality of strings based on the data related to the state of the user and the record.

10. A method of transmitting a message at a wearable device, the method comprising:
receiving a touch input from a user;
selecting at least one string from a plurality of strings based on data related to a state of the user, wherein the data is detected by a sensor of the wearable device and the selected at least one string is associated with a specific user movement of the detected data;
displaying the at least one string selected from the plurality of strings; and
transmitting a message including the selected at least one string to a receiver device.

11. The method of claim 10, wherein the data related to the state of the user comprises at least one of data related to the movement of the user, data related to a location of the user, and data related to a biometric signal of the user.

12. The method of claim 10,
wherein the data related to the state of the user comprises at least one of data related to a location of the user and data related to a biometric signal of the user,
wherein the selecting of the at least one string comprises selecting at least one of the plurality of strings based on the data related to the state of the user, and
wherein the displaying of the at least one string comprises displaying information related to the state of the user and the selected at least one string.

13. The method of claim 10,
wherein the displaying of the at least one string comprises displaying a string set including strings corresponding to the state of the user from the plurality of strings, and
wherein the transmitting of the message comprises:
receiving a user input for selecting at least one of the strings included in the string set, and
transmitting the message including the selected at least one string to the receiver device based on the user input.

14. The method of claim 10,
wherein the displaying of the at least one string comprises displaying a string selected based on the touch input from the plurality of strings and the at least one string selected based on the data related to the state of the user from the plurality of strings, and
wherein the transmitting of the message comprises transmitting the message including the string selected based on the touch input and the at least one string to the receiver device.

15. The method of claim 10, wherein the selecting of the at least one string comprises:
obtaining information about a schedule of the user; and
selecting the at least one string from the plurality of strings based on the data related to the state of the user and the information about the schedule.

16. The method of claim 10, wherein the displaying of the at least one string comprises:
obtaining information about the receiver device; and
selecting the at least one string from the plurality of strings based on the data related to the state of the user and the information about the receiver device.

17. An electronic device for transmitting a message by using a wearable device and a receiver device, the electronic device comprising:
a communicator; and
at least one processor configured to:
control the communicator to receive, from the wearable device, data related to a state of a user obtained from the wearable device,
control the communicator to receive, from the wearable device, a touch input of the user obtained from the wearable device,
select at least one of a plurality of strings based on the data related to the state of the user when the touch input is received, wherein the data is detected by a sensor of the wearable device and the selected at least one string is associated with a specific user movement of the detected data,
control the communicator to transmit, to the wearable device, the selected at least one string, and
control the communicator to transmit, to the receiver device, a message including the selected at least one string,
wherein the selected at least one string is displayed via the wearable device.

18. A method of transmitting a message by using a wearable device and a receiver device, wherein the method is performed by an electronic device, the method comprising:
receiving, at the electronic device, data related to a state of a user obtained from the wearable device and a touch input of the user obtained from the wearable device;
selecting at least one of a plurality of strings based on the data related to the state of the user when the touch input is received, wherein the data is detected by a sensor of the wearable device and the selected at least one string is associated with a specific user movement of the detected data;
transmitting, to the wearable device, the selected at least one string; and
transmitting, to the receiver device, a message including the at least one string,
wherein the transmitted at least one string is displayed via the wearable device.

* * * * *